US010290890B2

(12) United States Patent
Yan et al.

(10) Patent No.: US 10,290,890 B2
(45) Date of Patent: May 14, 2019

(54) POLY(ARYL PIPERIDINIUM) POLYMERS FOR USE AS HYDROXIDE EXCHANGE MEMBRANES AND IONOMERS

(71) Applicant: University of Delaware, Newark, DE (US)

(72) Inventors: Yushan Yan, Hockessin, DE (US); Bingjun Xu, West Chester, PA (US); Junhua Wang, Newark, DE (US); Yun Zhao, Newark, DE (US)

(73) Assignee: Universty of Delaware, Newark, DE (US)

( * ) Notice: Subject to any disclaimer, the term of this patent is extended or adjusted under 35 U.S.C. 154(b) by 0 days.

(21) Appl. No.: 16/146,887

(22) Filed: Sep. 28, 2018

(65) Prior Publication Data
US 2019/0036143 A1   Jan. 31, 2019

Related U.S. Application Data

(63) Continuation of application No. PCT/US2017/024615, filed on Mar. 28, 2017.

(60) Provisional application No. 62/314,008, filed on Mar. 28, 2016.

(51) Int. Cl.
| *H01M 8/10* | (2016.01) |
|---|---|
| *C08G 10/00* | (2006.01) |
| *H01M 8/1023* | (2016.01) |
| *B01D 71/62* | (2006.01) |
| *B01D 71/82* | (2006.01) |
| *B01D 71/44* | (2006.01) |
| *C08J 5/22* | (2006.01) |
| *H01M 8/1039* | (2016.01) |
| *H01M 8/106* | (2016.01) |
| *H01M 8/1069* | (2016.01) |
| *H01M 8/1081* | (2016.01) |
| *H01M 8/1018* | (2016.01) |

(52) U.S. Cl.
CPC .......... *H01M 8/1023* (2013.01); *B01D 71/44* (2013.01); *B01D 71/62* (2013.01); *B01D 71/82* (2013.01); *C08G 10/00* (2013.01); *C08J 5/2262* (2013.01); *H01M 8/106* (2013.01); *H01M 8/1039* (2013.01); *H01M 8/1069* (2013.01); *H01M 8/1081* (2013.01); *B01D 2325/42* (2013.01); *C08J 2361/18* (2013.01); *H01M 2008/1095* (2013.01); *Y02P 70/56* (2015.11)

(58) Field of Classification Search
CPC ............ H01M 8/1023; H01M 8/1039; H01M 8/1081; H01M 8/106; H01M 2208/1095; C08G 10/00; C08J 5/2262; C08J 2361/18
USPC ......................................................... 521/27
See application file for complete search history.

(56) References Cited

U.S. PATENT DOCUMENTS

| 3,480,626 A * | 11/1969 | Pfleger ................. C07D 471/20 250/396 R |
|---|---|---|
| 5,393,432 A * | 2/1995 | Tsuyumoto ............ B01D 71/62 210/500.37 |
| 5,869,655 A * | 2/1999 | Puckett ................ C07D 295/02 540/596 |
| 10,046,319 B2 * | 8/2018 | Meier-Haack ....... A61K 31/785 |

FOREIGN PATENT DOCUMENTS

CN            104829814 A  *  8/2015

OTHER PUBLICATIONS

International Search Report issued for PCT/US2017/024615 dated Aug. 28, 2017, 4 pages.
Written Opinion issued for PCT/US2017/024615 dated Aug. 28, 2017, 5 pages.

* cited by examiner

*Primary Examiner* — Michael Bernshteyn
(74) *Attorney, Agent, or Firm* — Stinson Leonard Street LLP

(57) ABSTRACT

Poly(aryl piperidinium) polymers are provided which have an alkaline-stable cation, piperidinium, introduced into a rigid aromatic polymer backbone free of ether bonds. Hydroxide exchange membranes or hydroxide exchange ionomers formed from these polymers exhibit superior chemical stability, hydroxide conductivity, decreased water uptake, good solubility in selected solvents, and improved mechanical properties in an ambient dry state as compared to conventional hydroxide exchange membranes or ionomers. Hydroxide exchange membrane fuel cells comprising the poly(aryl piperidinium) polymers exhibit enhanced performance and durability at relatively high temperatures.

26 Claims, 7 Drawing Sheets

POLY(ARYL PIPERIDINIUM) POLYMERS FOR USE AS HYDROXIDE EXCHANGE MEMBRANES AND IONOMERS

CROSS-REFERENCE TO RELATED APPLICATIONS

This application is a continuation of PCT/US2017/024615 filed Mar. 28, 2017, which claims the benefit of U.S. Provisional Patent Application Ser. No. 62/314,008 filed Mar. 28, 2016, the entire content of which are incorporated herein by reference.

GOVERNMENT LICENSE RIGHTS

This invention was partly made with Government support under grant DE-EE0006964 awarded by Office of Energy Efficiency and Renewable Energy of the United States Department of Energy. The Government has certain rights in the invention.

FIELD OF THE INVENTION

The present invention generally relates to anion exchange polymers capable of forming anion-exchange membranes (AEMs) and ionomers (AEIs) for use in anion exchange membrane fuel cells (AEMFCs). More specifically, hydroxide exchange polymers are provided which are capable of forming hydroxide-exchange membranes (HEMs) and ionomers (HEIs) for use in hydroxide exchange membrane fuel cells (HEMFCs).

BACKGROUND OF THE INVENTION

Proton exchange membrane fuel cells (PEMFCs) are considered to be clean and efficient power sources. Steele et al., *Nature* 2001, 414, 345. However, the high cost and unsatisfactory durability of catalysts are major barriers for large-scale commercialization of PEMFCs. Borup et al., N. *Chem Rev* 2007, 107, 3904. By switching the polymer electrolyte from an "acidic" condition to a "basic" one, HEMFCs are able to work with non-precious metal catalysts and the catalysts are expected to be more durable. Other cheaper fuel cell components are also possible such as metal bipolar plates. Varcoe, et al., *Fuel Cells* 2005, 5, 187; Gu et al., *Angew Chem Int Edit* 2009, 48, 6499; Gu et al., *Chem Commun* 2013, 49, 131. However, currently available HEMs and HEIs exhibit low alkaline/chemical stability, low hydroxide conductivity, high water uptake, and low mechanical integrity under dry conditions, especially after wet-dry cycles.

The biggest challenge for HEMs/HEIs at present is achieving a high chemical stability at desired operation temperatures of 80° C. or more, and ideally 95° C. or more (e.g., in the presence of nucleophilic hydroxide ions). Varcoe et al., *Energ Environ Sci* 2014, 7, 3135. The most commonly encountered cationic functional groups (e.g., benzyl trimethyl ammonium and alkyl chain ammonium) can undergo a number of degradation processes in the presence of hydroxide ions nucleophiles by direct nucleophilic substitution and Hofmann elimination. Moreover, the polymer backbone of most base polymers for HEM/HEI applications (e.g., polysulfone and poly(phenylene oxide)) unavoidably contains ether linkages along the backbone, which makes the HEMs/HEIs potentially labile under high pH conditions. Lee et al., *Acs Macro Lett* 2015, 4, 453; Lee et al., *Acs Macro Lett* 2015, 4, 814. The strongly nucleophilic hydroxide ions attack these weak bonds and degrade the polymer backbone. Thus, alternative cationic groups, organic tethers, and polymer backbones are needed to enhance chemical stability of HEMs/HEIs.

Another concern regarding current HEMs/HEIs is their hydroxide conductivity. In comparison to Nafion, HEMs have intrinsically lower ionic conductivities under similar conditions, because the mobility of OH⁻ is lower than that of H. Hibbs et al., *Chem Mater* 2008, 20, 2566. Greater ion-exchange capacity (IEC) is needed for HEMs/HEIs to achieve greater hydroxide conductivity. However, high IEC usually leads to a membrane having high water uptake (i.e., a high swelling ratio), decreasing the morphological stability and mechanical strength of the membrane, especially after repeated wet-dry cycles. This highly swollen state when wet is a major reason for decreased flexibility and brittleness of HEMs when dry. The removal of the trade-off between high hydroxide conductivity and low water uptake has been a major setback in designing high-performance HEMs/HEIs. Pan et al., *Energ Environ Sci* 2013, 6, 2912. Chemical cross-linking, physical reinforcement, side-chain polymerization, and block-copolymer architecture have been tried to reduce water uptake while maintaining acceptable hydroxide conductivity, but these techniques bring challenging problems, e.g., reduced mechanical flexibility, decreased alkaline stability, and/or increased cost. Gu et al., *Chem Commun* 2011, 47, 2856; Park et al., *Electrochem Solid St* 2012, 15, B27; Wang et al., *Chemsuschem* 2015, 8, 4229; Ran et al., *Sci Rep-Uk* 2014, 4; Tanaka et al., *J Am Chem Soc* 2011, 133, 10646. Additionally, almost all side-chain or block-copolymer HEMs are based on flexible aliphatic polymer chains due to limited available synthesis methods. As a result, the membranes still cannot provide morphological stability (low swell ratio) at high IECs and high temperature. Wang et al., *Chemsuschem* 2015, 8, 4229; Ran et al., *Sci Rep-Uk* 2014, 4; Marino et al., *Chemsuschem* 2015, 8, 513; Li et al, M. *Macromolecules* 2015, 48, 6523.

An additional obstacle to using HEMs is achievement of mechanical flexibility and strength in an ambient dry state. Most HEMs exhibit low mechanical strength and are very brittle in a completely dry state especially after being completely swollen. It is difficult to obtain and handle thin membranes that are large in size as needed for commercial use of HEMs. Without good mechanical properties, the ionomers cannot form and keep an adequate triple phase structure in the fuel cell electrode at high temperature, such as at or above 80° C. Li et al., *J Am Chem Soc* 2013, 135, 10124.

Another highly desirable feature of an HEI is that the polymer be soluble in a mixture of lower boiling alcohol and water but insoluble in pure alcohol or water so that the HEIs can be readily incorporated into an electrode catalyst layer yet not be dissolved away by water or alcohol.

SUMMARY OF THE INVENTION

A polymer is provided which comprises a reaction product of a polymerization mixture comprising (i) a piperidone monomer having the formula:

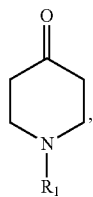
(1)

or a 3-oxo-6-azoniaspiro[5.5]undecane salt monomer having the formula:

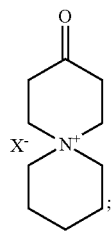
(2)

(ii) an aromatic monomer having the formula:

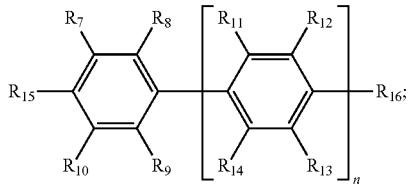
(3)

and (iii) optionally, a trifluoroacetophenone monomer having the formula:

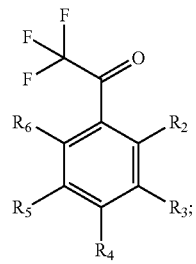
(4)

wherein:

$R_1$ is alkyl, alkenyl, or alkynyl, and the alkyl, alkenyl or alkynyl are optionally substituted with fluoride;

$R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$, and $R_{16}$ are each independently hydrogen, alkyl, alkenyl, or alkynyl, and the alkyl, alkenyl or alkynyl are optionally substituted with fluoride;

n is 0, 1, 2 or 3; and $X^-$ is an anion.

Another polymer is provided which comprises a reaction product of an alkylating agent and the polymer as described above comprising the reaction product of the polymerization mixture comprising the piperidone monomer.

Yet another polymer is provided which comprises a reaction product of a base and either the polymer as described above, or the polymer comprising the reaction product of the polymerization mixture comprising the 3-oxo-6-azoniaspiro[5.5]undecane salt.

An anion exchange polymer is also provided which comprises structural units of Formulae 1A or 2A, 3A, and optionally 4A, wherein the sum of the mole fractions of the structural unit of Formula 1A or 2A and Formulae 4A is equal to the mole fraction of Formulae 3A in the polymer calculated from the amounts of monomers used in a polymerization reaction to form the polymer, and the mole ratio of the structural unit of Formula 1A or 2A to the structural unit of Formula 3A is from 0.01 to 1 calculated from the amounts of monomers used in the polymerization reaction, wherein the structural units of Formulae 1A, 2A, 3A and 4A have the structures:

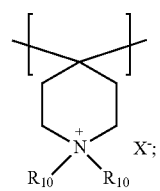
(1A)

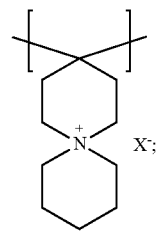
(2A)

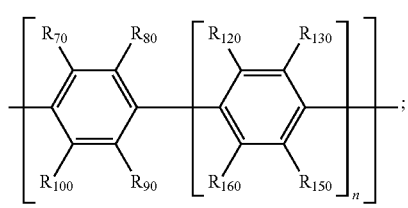
(3A)

and

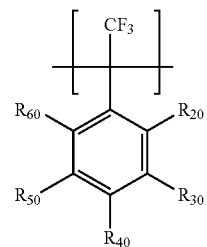
(4A)

wherein:

$R_{10}$ are each independently alkyl, alkenyl, or alkynyl, and the alkyl, alkenyl or alkynyl are optionally substituted with fluoride;

$R_{20}$, $R_{30}$, $R_{40}$, $R_{50}$, $R_{60}$, $R_{70}$, $R_{80}$, $R_{90}$, $R_{100}$, $R_{120}$, $R_{130}$, $R_{150}$, and $R_{160}$ are each independently hydrogen, alkyl, alkenyl, or alkynyl, and the alkyl, alkenyl or alkynyl are optionally substituted with fluoride;

n is 0, 1, 2 or 3; and $X^-$ is an anion.

An hydroxide exchange polymer is provided which comprises a poly(aryl piperidinium) backbone free of ether linkages, and has water uptake not more than 60% based on the dry weight of the polymer when immersed in pure water at 95° C., or has hydroxide conductivity in pure water at 95° C. of at least 100 mS/cm.

Another hydroxide exchange polymer is provided which comprises a poly(aryl piperidinium) backbone free of ether linkages, and has either a peak power density of at least 350 mW/cm² when the polymer is used as HEM and HEI of an HEMFC and is loaded at 20% as an hydroxide exchange ionomer in the cathodic and anodic catalyst layers of the fuel cell, the fuel cell having a 50% Pt/C catalyst and catalyst loading of 0.4 mg Pt/cm², and test conditions being hydrogen and oxygen flow rates of 0.6 L/min, back pressure of 0.1 $MPa_g$, and anode and cathode humidifiers at 95° C. and 98° C., respectively; or a decrease in voltage over 5.5 hours of operation of not more than 20% and an increase in resistance over 5.5 hours of operation of not more than 20% when the polymer is used as an HEM/HEI of an HEMFC and is loaded at 20% as an hydroxide exchange ionomer in the cathodic and anodic catalyst layers of the fuel cell, the fuel cell having a 50% Pt/C catalyst and catalyst loading of 0.4 mg Pt/cm², and test conditions being constant current density of 400 mA/cm², hydrogen and oxygen flow rates of 0.2 L/min, back pressure of 0.05 $MPa_g$, and anode and cathode humidifiers at 95° C. and 98° C., respectively.

A method of making a polymer as described above is provided, the method comprising: reacting the piperidone monomer, the optional 2,2,2-trifluoroacetophenone monomer, and the aromatic monomer in the presence of an organic solvent and a polymerization catalyst to form a piperidine-functionalized intermediate polymer; alkylating the piperidine-functionalized intermediate polymer in the presence of an organic solvent to form a piperidinium-functionalized intermediate polymer; and reacting the piperidinium-functionalized intermediate polymer with a base to form the polymer.

A method of making an hydroxide exchange polymer membrane comprising an hydroxide exchange polymer as described above is also provided, the method comprising: reacting the piperidone monomer, the optional 2,2,2-trifluoroacetophenone monomer, and the aromatic monomer in the presence of an organic solvent and a polymerization catalyst to form a piperidine-functionalized intermediate polymer; reacting the piperidine-functionalized intermediate polymer with an alkylating agent in the presence of an organic solvent to form a piperidinium-functionalized intermediate polymer; dissolving the piperidinium-functionalized intermediate polymer in a solvent to form a polymer solution; casting the polymer solution to form a polymer membrane; and exchanging anions of the polymer membrane with hydroxide ions to form the hydroxide exchange polymer membrane.

An anion exchange membrane is provided which is configured and sized to be suitable for use in a fuel cell and comprises a polymer as described above.

An anion exchange membrane fuel cell is provided which comprises a polymer as described above.

Other objects and features will be in part apparent and in part pointed out hereinafter.

BRIEF DESCRIPTION OF THE DRAWINGS

Corresponding reference characters indicate corresponding parts throughout the drawings.

DESCRIPTION OF THE PREFERRED EMBODIMENTS

Figure 1:
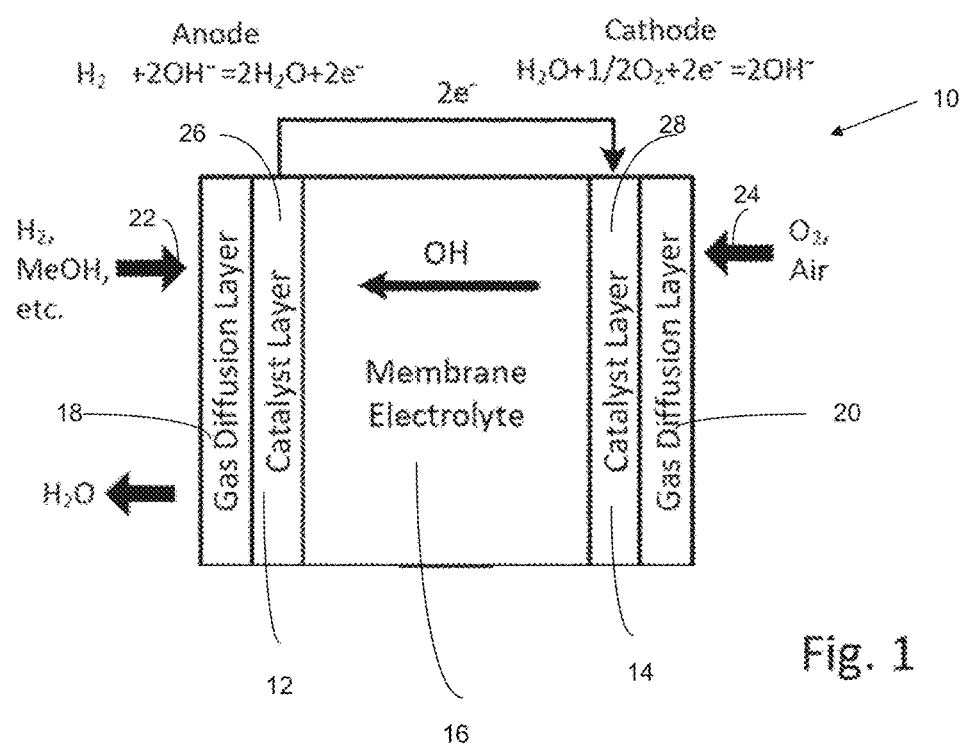
FIG. 1 illustrates an exemplary hydroxide exchange membrane fuel cell.

HEMs/HEIs formed from poly(aryl piperidinium) polymers having intrinsic hydroxide conduction channels have been discovered which simultaneously provide improved chemical stability, conductivity, water uptake, mechanical properties, and other attributes relevant to HEM/HEI performance. The poly(aryl piperidinium) polymers have an alkaline-stable cation, piperidinium, introduced into a rigid aromatic polymer backbone free of ether bonds. HEMs/HEIs formed from these polymers exhibit superior chemical stability, hydroxide conductivity, decreased water uptake, good solubility in selected solvents, and improved mechanical properties in an ambient dry state as compared to conventional HEM/HEIs. The inventive HEMFCs exhibit enhanced performance and durability at relatively high temperatures.

A polymer is provided which comprises a reaction product of a polymerization mixture comprising (i) either a piperidone monomer or a 3-oxo-6-azoniaspiro[5.5]undecane salt monomer, (ii) an aromatic monomer, and (iii) optionally, a trifluoroacetophenone monomer. This polymer is referred to herein as a piperidine-functionalized polymer.

The piperidone monomer has the formula:

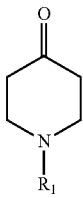

(1)

wherein $R_1$ is alkyl, alkenyl, or alkynyl, and the alkyl, alkenyl or alkynyl are optionally substituted with fluoride. Preferably, $R_1$ is alkyl such as methyl, ethyl, propyl, butyl, pentyl, or hexyl. Preferably, the piperidone monomer comprises N-methyl-4-piperidone.

The 3-oxo-6-azoniaspiro[5.5]undecane salt monomer has the formula:

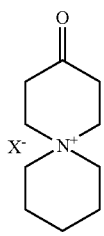

(2)

wherein $X^-$ is an anion. Preferably, $X^-$ is a halide such as chloride, fluoride, bromide, or iodide, $BF_4^-$, or $PF_6^-$. Preferably, the 3-oxo-6-azoniaspiro[5.5]undecane salt monomer comprises 3-oxo-6-azoniaspiro[5.5]undecane iodide.

The aromatic monomer has the formula:

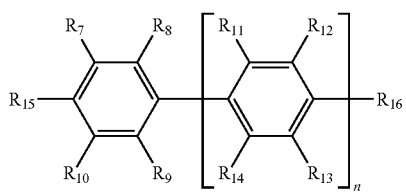

(3)

wherein: $R_7$, $R_8$, $R_9$, $R_{10}$, $R_{11}$, $R_{12}$, $R_{13}$, $R_{14}$, $R_{15}$, and $R_{16}$ are each independently hydrogen, alkyl, alkenyl, or alkynyl, and the alkyl, alkenyl or alkynyl are optionally substituted with fluoride; and n is 0, 1, 2 or 3. Preferably, $R_7$, $R_8$, $R_9$, $R_{10}$, $R_{11}$, $R_{12}$, $R_{13}$, $R_{14}$, $R_{15}$, and $R_{16}$ are each independently hydrogen, or alkyl optionally substituted with fluoride, such as methyl, ethyl, propyl, butyl, pentyl or hexyl or methyl, ethyl, propyl, butyl, pentyl, or hexyl substituted with fluoride. Preferably, the aromatic monomer comprises biphenyl, para-terphenyl, para-quaterphenyl or benzene.

The trifluoroacetophenone monomer has the formula:

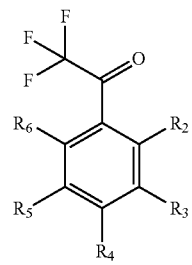

(4)

wherein $R_2$, $R_3$, $R_4$, $R_5$, and $R_6$ are each independently hydrogen, alkyl, alkenyl, or alkynyl, and the alkyl, alkenyl or alkynyl are optionally substituted with fluoride. Preferably, $R_2$, $R_3$, $R_4$, $R_5$, and $R_6$ are each independently hydrogen, or alkyl optionally substituted with fluoride, such as methyl, ethyl, propyl, butyl, pentyl or hexyl or methyl, ethyl, propyl, butyl, pentyl, or hexyl optionally substituted with fluoride. Preferably, the 2,2,2-trifluoroacetophenone monomer comprises 2,2,2-trifluoroacetophenone.

A polymer is also provided which comprises a reaction product of an alkylating agent and the polymer comprising the reaction product of the polymerization mixture comprising the piperidone monomer. This polymer is referred to herein as a piperidinium-functionalized polymer.

Another polymer is provided which comprises a reaction product of a base and the piperidinium-functionalized polymer, or the piperidine-functionalized polymer comprising the reaction product of the polymerization mixture comprising the 3-oxo-6-azoniaspiro[5.5]undecane salt. This polymer is referred to herein as a poly(aryl piperidinium) polymer.

Preferably, the base comprises an hydroxide-containing base such as sodium hydroxide or potassium hydroxide.

The poly(aryl piperidinium) polymer can also be an anion exchange polymer which comprises structural units of Formulae 1A or 2A, 3A, and optionally 4A, wherein the sum of the mole fractions of the structural unit of Formula 1A or 2A and Formulae 4A is equal to the mole fraction of Formulae 3A in the polymer calculated from the amounts of monomers used in a polymerization reaction to form the polymer, and the mole ratio of the structural unit of Formula 1A or 2A to the structural unit of Formula 3A is from 0.01 to 1 calculated from the amounts of monomers used in the polymerization reaction. The structural units of Formulae 1A, 2A, 3A and 4A have the structures:

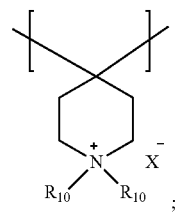

(1A)

-continued

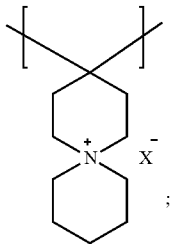

(2A)

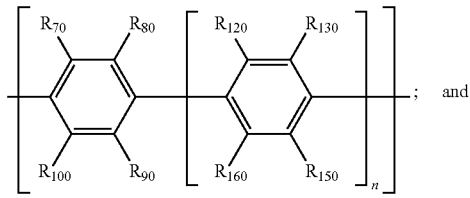

(3A)

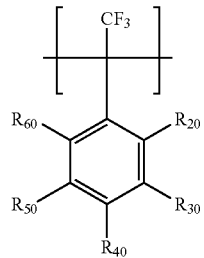

(4A)

wherein: $R_{10}$ are each independently alkyl, alkenyl, or alkynyl, and the alkyl, alkenyl or alkynyl are optionally substituted with fluoride; $R_{20}$, $R_{30}$, $R_{40}$, $R_{50}$, $R_{60}$, $R_{70}$, $R_{80}$, $R_{90}$, $R_{100}$, $R_{120}$, $R_{130}$, $R_{150}$, and $R_{160}$ are each independently hydrogen, alkyl, alkenyl, or alkynyl, and the alkyl, alkenyl or alkynyl are optionally substituted with fluoride; n is 0, 1, 2 or 3; and $X^-$ is an anion such as hydroxide.

The poly(aryl piperidinium) polymer can be an hydroxide exchange polymer which comprises a poly(aryl piperidinium) backbone free of ether linkages, has water uptake not more than 60% based on the dry weight of the polymer when immersed in pure water at 95° C., or has hydroxide conductivity in pure water at 95° C. of at least 100 mS/cm. Also, this polymer can be stable to degradation (as evidenced by no change in peak position on its $^1$H NMR spectra) when immersed in 1 M potassium hydroxide at 100° C. for 2,000 hours; be insoluble in pure water and isopropanol at 100° C., but is soluble in a 50/50 mixture by weight of water and isopropanol at 100° C.; and have a tensile strength of at least 100 MPa and elongation at break of at least 7%.

The poly(aryl piperidinium) polymer can be an hydroxide exchange polymer which comprises a poly(aryl piperidinium) backbone free of ether linkages, and has a peak power density of at least 350 mW/cm² when the polymer is used as an hydroxide exchange membrane of an hydroxide exchange membrane fuel cell and is loaded at 20% as an hydroxide exchange ionomer in the cathodic and anodic catalyst layers of the fuel cell, the fuel cell having a 50% Pt/C catalyst and catalyst loading of 0.4 mg Pt/cm², and test conditions being hydrogen and oxygen flow rates of 0.6 L/min, back pressure of 0.1 MPa$_g$, and anode and cathode humidifiers at 95° C. and 98° C., respectively; or has a decrease in voltage over 5.5 hours of operation of not more than 20% and an increase in resistance over 5.5 hours of operation of not more than 20% when the polymer is used as an hydroxide exchange membrane of an hydroxide exchange membrane fuel cell and is loaded at 20% as an hydroxide exchange ionomer in the cathodic and anodic catalyst layers of the fuel cell, the fuel cell having a 50% Pt/C catalyst and catalyst loading of 0.4 mg Pt/cm², and test conditions being constant current density of 400 mA/cm², hydrogen and oxygen flow rates of 0.2 L/min, back pressure of 0.05 MPa$_g$, and anode and cathode humidifiers at 95° C. and 98° C., respectively.

Preferably, the aryl linkages of the poly(aryl piperidinium) backbone free of ether linkages comprise p-phenyl, and the piperidinium linkages comprise hydroxide anions.

The aryl linkages of the poly(aryl piperidinium) backbone can be derived, for example, from biphenyl, para-terphenyl, para-quaterphenyl or benzene monomers.

The piperidinium linkages of the poly(aryl piperidinium) backbone are derived from N,N-dimethyl-4-piperidinium or 3-oxo-6-azoniaspiro[5.5]undecane salt monomers.

The poly(aryl piperidinium) polymer backbone can further comprise 2,2,2-trifluoroethylbenzene linkages derived from 2,2,2-trifluoroacetophenone monomer.

The piperidine-functionalized polymer can be prepared by a method which comprises reacting the piperidone monomer, the optional 2,2,2-trifluoroacetophenone monomer, and the aromatic monomer in the presence of an organic solvent and a polymerization catalyst.

The piperidinium-functionalized polymer can be prepared by a method which comprises alkylating the piperidine-functionalized polymer in the presence of an organic solvent.

The poly(aryl piperidinium) polymers can be prepared by a method which comprises reacting the piperidone monomer, the optional 2,2,2-trifluoroacetophenone monomer, and the aromatic monomer in the presence of an organic solvent and a polymerization catalyst to form a piperidine-functionalized intermediate polymer; alkylating the piperidine-functionalized intermediate polymer in the presence of an organic solvent to form a piperidinium-functionalized intermediate polymer; and reacting the piperidinium-functionalized intermediate polymer with a base to form the poly(aryl piperidinium) polymer.

For example, a piperidone monomer such as N-methyl-4-piperidone, an optional 2,2,2-trifluoroacetophenone monomer such as 2,2,2-trifluoroacetophenone, and an aromatic monomer such as benzene, biphenyl, p-terphenyl or p-quaterphenyl can be placed in a stirred container and dissolved into an organic solvent. A polymerization catalyst in a solvent can then be added dropwise over up to 60 minutes at −78 to 60° C. Thereafter, the reaction is continued at this temperature for about 1 to about 120 hours. The resulting solution is poured slowly into an aqueous solution of ethanol. The solid obtained is filtered, washed with water and immersed in 1 M $K_2CO_3$ at room temperature for about 1 to 48 hours. Finally, the product is filtered, washed with water and dried completely under vacuum to form a piperidine-functionalized intermediate polymer.

Next, the piperidine-functionalized polymer is dissolved into an organic solvent in a stirred container. An alkylating agent is added quickly. The solution is stirred over about 1 to 48 hours at 0 to 100° C. The resulting solution is added dropwise into ether. The resulting solid is filtered, washed with ether and dried completely to form the piperidinium-functionalized polymer.

The piperidinium-functionalized polymer is then subjected to anion exchange, for example in 1 M KOH for hydroxide exchange, at about 20 to 100° C. for about 12 to 48 hours, followed by washing and immersion in DI water for about 12 to 48 hours under an oxygen-free atmosphere to remove residual KOH.

The poly(aryl piperidinium) polymers can be made into hydroxide exchange membranes. Such hydroxide exchange polymer membranes can be prepared by a method which comprises reacting the piperidone monomer, the optional 2,2,2-trifluoroacetophenone monomer, and the aromatic monomer in the presence of an organic solvent and a polymerization catalyst to form a piperidine-functionalized intermediate polymer; reacting the piperidine-functionalized intermediate polymer with an alkylating agent in the presence of an organic solvent to form a piperidinium-functionalized intermediate polymer; dissolving the piperidinium-functionalized intermediate polymer in a solvent to form a polymer solution; casting the polymer solution to form a polymer membrane; and exchanging anions of the polymer membrane with hydroxide ions to form the hydroxide exchange polymer membrane.

The poly(aryl piperidinium) polymers can be made into reinforced hydroxide exchange membranes as described below. Such reinforced hydroxide exchange membranes can be prepared by a method which comprises wetting a porous substrate in a liquid to form a wetted substrate; dissolving the poly(aryl piperidinium) polymer in a solvent to form a homogeneous solution; applying the solution onto the wetted substrate to form the reinforced membrane; drying the reinforced membrane; and exchanging anions of the reinforced membrane with hydroxide ions to form the reinforced hydroxide exchange polymer membrane. The solution can be applied to the wetted substrate by any known membrane formation technique such as casting, spraying, or doctor knifing.

The resulting reinforced membrane can be impregnated with the poly(aryl piperidinium) polymer multiple times if desired by wetting the reinforced membrane again and repeating the dissolving, casting and drying steps.

The polymerization catalyst used in forming the piperidine-functionalized intermediate polymer can comprise trifluoromethanesulfonic acid, pentafluoroethanesulfonic acid, heptafluoro-1-propanesulfonic acid, trifluoroacetic acid, perfluoropropionic acid, heptafluorobutyric acid, or a combination thereof.

The alkylating agent used in forming the piperidinium-functionalized intermediate polymer can comprise an alkyl halide such as methyl iodide, iodoethane, 1-iodopropane, 1-iodobutane, 1-iodopentane, 1-iodohexane, or a combination thereof.

Each of the organic solvents used in the above methods can be independently selected from polar aprotic solvents (e.g., dimethyl sulfoxide, 1-methyl-2-pyrrolidinone, or dimethylformamide) or other suitable solvents including, but are not limited to, methylene chloride, trifluoroacetic acid, trifluoromethanesulfonic acid, chloroform, 1,1,2,2-tetrachloroethane, or a combination thereof.

The liquid used to wet the porous substrate can be a low boiling point solvent such as a lower alcohol (e.g., methanol, ethanol, propanol, isopropanol) and/or water. Preferably, the liquid is anhydrous ethanol.

An anion exchange membrane such as a hydroxide exchange membrane is also provided. The membrane is configured and sized to be suitable for use in a fuel cell and comprises any of the poly(aryl piperidinium) polymers as described herein.

A reinforced electrolyte membrane such as a reinforced hydroxide exchange membrane is also provided to increase the mechanical robustness of the anion exchange membrane for stability through numerous wet and dry cycles (relative humidity cycling) in a fuel cell. The membrane is configured and sized to be suitable for use in a fuel cell, and comprises a porous substrate impregnated with any of the poly(aryl piperidinium) polymers as described herein. Methods for preparing reinforced membranes are well known to those of ordinary skill in the art such as those disclosed in U.S. Pat. Nos. RE37,656 and RE37,701, which are incorporated herein by reference for their description of reinforced membrane synthesis and materials.

The porous substrate can comprise a membrane comprised of polytetrafluoroethylene, polypropylene, polyethylene, poly(ether ketone), or other porous polymers known in the art such as the dimensionally stable membrane from Giner for use in preparing reinforced membranes for fuel cells. Such porous substrates are commercially available, for example, from W.L. Gore & Associates.

The porous substrate can have a porous microstructure of polymeric fibrils. Such substrates comprised of polytetrafluoroethylene are commercially available. The porous substrate can comprise a microstructure of nodes interconnected by fibrils.

The interior volume of the porous substrate can be rendered substantially occlusive by impregnation with the poly (aryl piperidinium) polymer.

The porous substrate can have a thickness from about 1 micron to about 10, 15, 20, 25, 30, 35, 40, 45, 50, 55, 60, 65, 70, 75, 80, 85, 90, 95 or 100 microns. Preferably, the porous substrate has a thickness from about 5 microns to about 30 microns, or from about 7 microns to about 20 microns.

An anion exchange membrane fuel cell is also provided which comprises any of the poly(aryl piperidinium) polymers as described herein.

The poly(aryl piperidinium) polymers can be used in HEMFCs such as a typical fuel cell 10 as shown in FIG. 1. FIG. 1 illustrates a typical fuel cell 10 with an anode portion 12 (illustrated on the left) and a cathode portion 14 (illustrated on the right) which are separated by an electrolyte membrane 16. The electrolyte membrane 16 can be any membrane comprising any of the poly(aryl piperidinium) polymers as described herein, and can be a reinforced membrane. Supporting members are not illustrated. The anode portion carries out an anode half-reaction which oxidizes fuel releasing electrons to an external circuit and producing oxidized products. The cathode portion carries out a cathode half-reaction which reduces an oxidizer consuming electrons from the external circuit. The gas diffusion layers (GDLs) 18 and 20 serve to deliver the fuel 22 and oxidizer 24 uniformly across the respective catalyst layers 26 and 28. Charge neutrality is maintained by a flow of ions from the anode to the cathode for positive ions and from cathode to anode for negative ions. The dimensions illustrated are not representative, as the electrolyte membrane is usually selected to be as thin as possible while maintaining the membrane's structural integrity.

In the case of the illustrated hydroxide exchange membrane fuel cell (HEMFC), the anode half-reaction consumes fuel and $OH^-$ ions and produces waste water (as well as carbon dioxide in the case of carbon containing fuels). The cathode half reaction consumes oxygen and produces $OH^-$ ions, which flow from the cathode to the anode through the electrolyte membrane. Fuels are limited only by the oxidizing ability of the anode catalyst and typically include hydrogen gas, methanol, ethanol, ethylene glycol, and glycerol. Preferably, the fuel is $H_2$ or methanol. Catalysts are usually platinum (Pt), gold (Ag), or one or more transition metals, e.g., Ni. In the case of a PEMFC, the anode half-reaction consumes fuel and produces $H^+$ ions and electrons. The cathode half reaction consumes oxygen, $H^+$ ions, and electrons and produces waste water, and $H^+$ ions (protons) flow from the anode to the cathode through the electrolyte membrane.

It can, therefore, be appreciated how an electrolyte membrane made from a poly(aryl piperidinium) polymer significantly improves fuel cell performance. First, greater fuel cell efficiency requires low internal resistance, and therefore, electrolyte membranes with greater ionic conductivity (decreased ionic resistance) are preferred. Second, greater power requires greater fuel cell currents, and therefore, electrolyte membranes with greater ion-current carrying capacity are preferred. Also, practical electrolyte membranes resist chemical degradation and are mechanically stable in a fuel cell environment, and also should be readily manufactured.

Although a principal application for the poly(aryl piperidinium) polymers is for energy conversion such as in use in anion exchange membranes, hydroxide exchange membranes, anion exchange membrane fuel cells, and hydroxide exchange membrane fuel cells, the anion/hydroxide exchange ionomers and membranes can be used for many other purposes such as use in fuel cells (e.g., hydrogen/alcohol/ammonia fuel cells); electrolyzers (e.g., water/carbon dioxide/ammonia electrolyzers), electrodialyzers; ion-exchangers; solar hydrogen generators; desalinators (e.g., desalination of sea/brackish water); demineralization of water; ultra-pure water production; waste water treatment; concentration of electrolyte solutions in the food, drug, chemical, and biotechnology fields; electrolysis (e.g., chlor-alkali production and $H_2/O_2$ production); energy storage (e.g., super capacitors, metal air batteries and redox flow batteries); sensors (e.g., pH/RH sensors); and in other applications where an anion-conductive ionomer is advantageous.

Having described the invention in detail, it will be apparent that modifications and variations are possible without departing from the scope of the invention defined in the appended claims.

EXAMPLES

The following non-limiting examples are provided to further illustrate the present invention.

Example 1

A poly(aryl piperidinium) was prepared from N-methyl-4-piperidone, 2,2,2-trifluoroacetophenone and biphenyl (referred to as PAP-1-x, wherein x is the mole ratio of N-methyl-4-piperidone to 2,2,2-trifluoroacetophenone and is from 1 to 100). PAP-1-x was prepared by three major steps: (1) synthesis of a piperidine-functionalized polymer, (2) synthesis of a piperidinium-functionalized polymer, and (3) membrane casting and hydroxide ion exchange. The reaction scheme is depicted below:

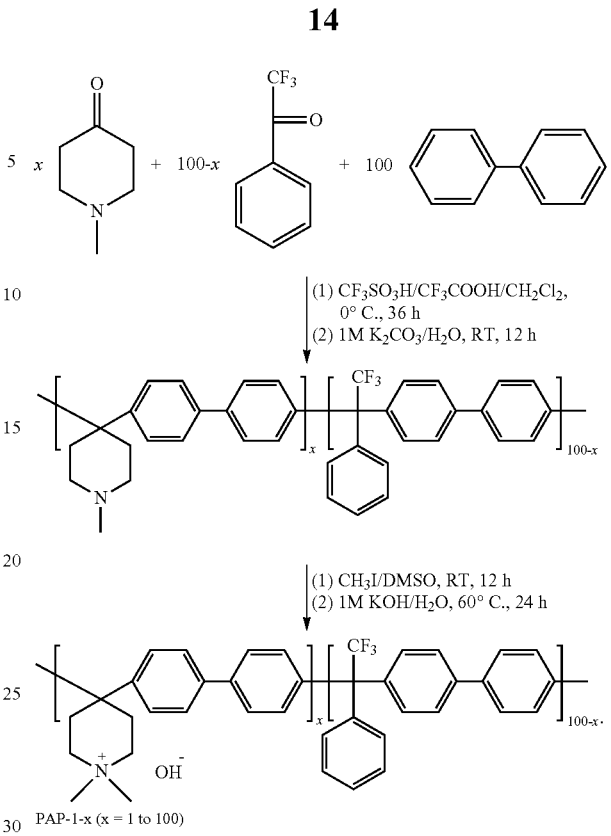

(1) Synthesis of a Piperidine-Functionalized Polymer.

Figure 2:
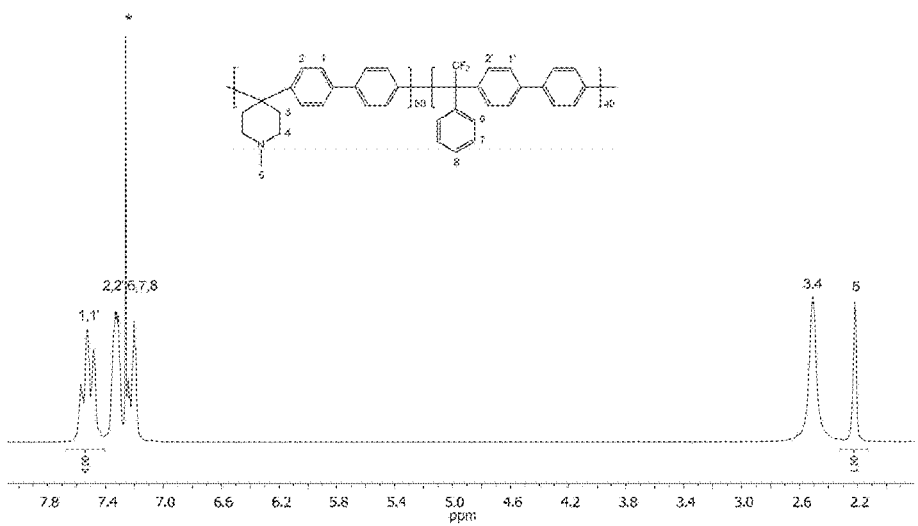
FIG. 2 depicts an ¹H NMR spectrum of a piperidine-functionalized polymer.

To a 100 mL three-necked flask equipped with overhead mechanical stirrer, N-methyl-4-piperidone (0.6790 g, 6 mmol), 2,2,2-trifluoroacetophenone (0.6965 g, 4 mmol) and biphenyl (1.5421 g, 10 mmol) were dissolved into methylene chloride (10 mL). Trifluoroacetic acid (TFA) (0.5 mL) and trifluoromethanesulfonic acid (TFSA) (10 mL) were then added dropwise over 30 minutes at 0° C. Thereafter, the reaction was continued at this temperature for 36 hours. The resulting viscous, brown solution was poured slowly into an aqueous solution of ethanol. The white fibrous solid was filtered, washed with water and immersed in 1 M $K_2CO_3$ at room temperature for 12 hours. Finally, the white fibrous product was filtered, washed with water and dried completely at 60° C. under vacuum. The yield of the polymer was nearly 100%. $^1$H NMR (CDCl$_3$, δ, ppm): 7.57-7.48 ($H_1$ and $H_{1'}$), 7.34-7.19 ($H_2$, $H_{2'}$, $H_6$, $H_7$ and $H_8$), 2.51 ($H_3$ and $H_4$), and 2.22 ($H_5$) (see FIG. 2).

(2) Synthesis of Piperidinium-Functionalized Polymer (PAP-1-60).

Figure 3:
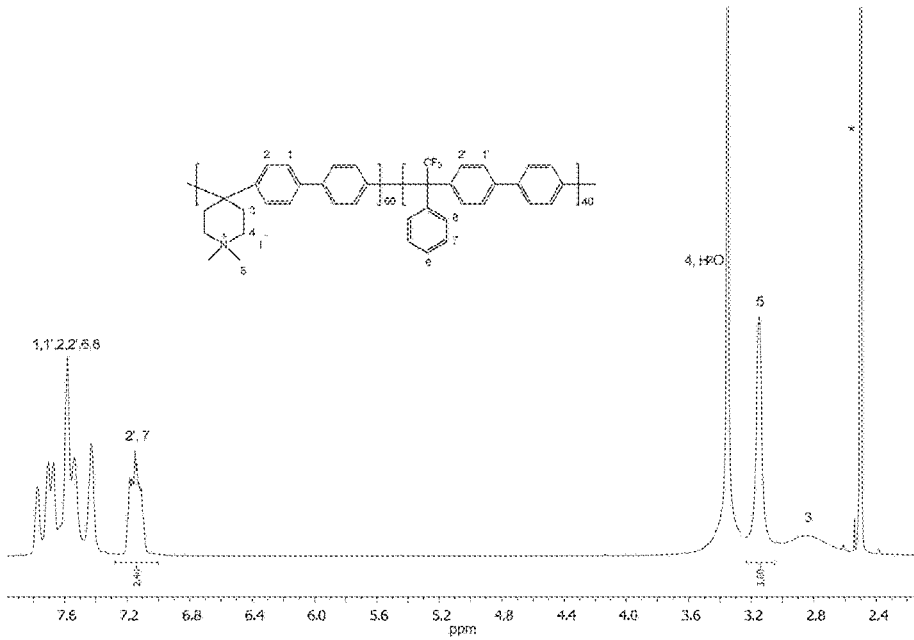
FIG. 3 depicts an ¹H NMR spectrum of a piperidinium-functionalized polymer (PAP-1-60)

To a 50 mL one-necked flask equipped with magnetic bar, piperidine-functionalized polymer (1.0 g) was dissolved into 1-methyl-2-pyrrolidinone (20 mL). Methyl iodide (1 mL) was added quickly. The solution was stirred over 12 hours at room temperature. The resulting viscous, yellow solution was added dropwise into ether. The yellow solid was filtered, washed with ether and dried completely at 60° C. under vacuum. The yield of the polymer PAP-1-60 was almost 100%. $^1$H NMR (DMSO-d6, δ, ppm): 7.77-7.35 ($H_1$, $H_{1'}$, $H_2$ and $H_{2'}$), 7.18-7.11 ($H_6$, $H_7$ and $H_8$), 3.35 ($H_4$), 3.15 ($H_5$), and 2.85 ($H_3$) (see FIG. 3).

(3) PAP-1-60 Membrane Casting and Hydroxide Exchange.

Membrane was prepared by dissolving the PAP-1-60 polymer (1.0 g) in NMP (20 mL) by casting on a clear glass plate at 80° C. for 8 hours. The membrane (in iodide form) was peeled off from the glass plate in contact with deionized (DI) water. The membrane in hydroxide form were obtained by ion exchange in 1 M KOH at 60° C. for 24 hours, followed by washing and immersion in DI water for 48 hours under argon to remove residual KOH.

Other PAP-1-x membranes were prepared by using different mole ratios of N-methyl-4-piperidone to 2,2,2-trifluoroacetophenone.

(4) Alkaline Stability.

Figure 4:
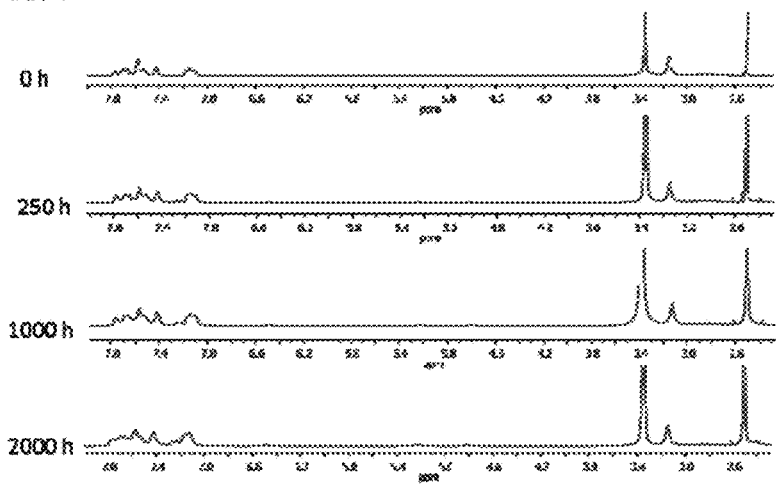
FIG. 4 shows an ¹H NMR spectra of a piperidinium-functionalized polymer PAP-1-60 (a) before and (b) after a stability test in 1M KOH solution at 100° C.

Alkaline stability of the PAP-1-x polymer was evaluated by immersing the membrane into 1 M KOH water solution at 100° C. The $^1$H NMR spectra of PAP-1-60 before and after the alkaline test for 2000 hours are shown in FIG. 4. No change in chemical shift was observed. This result confirmed that highly alkaline stable piperidinium cation implanted in a rigid aryl polymer backbone structure without ether bonds can afford remarkable chemical stability under alkaline conditions even at high temperature.

(5) Water Uptake and Hydroxide Conductivity.

Figure 5:
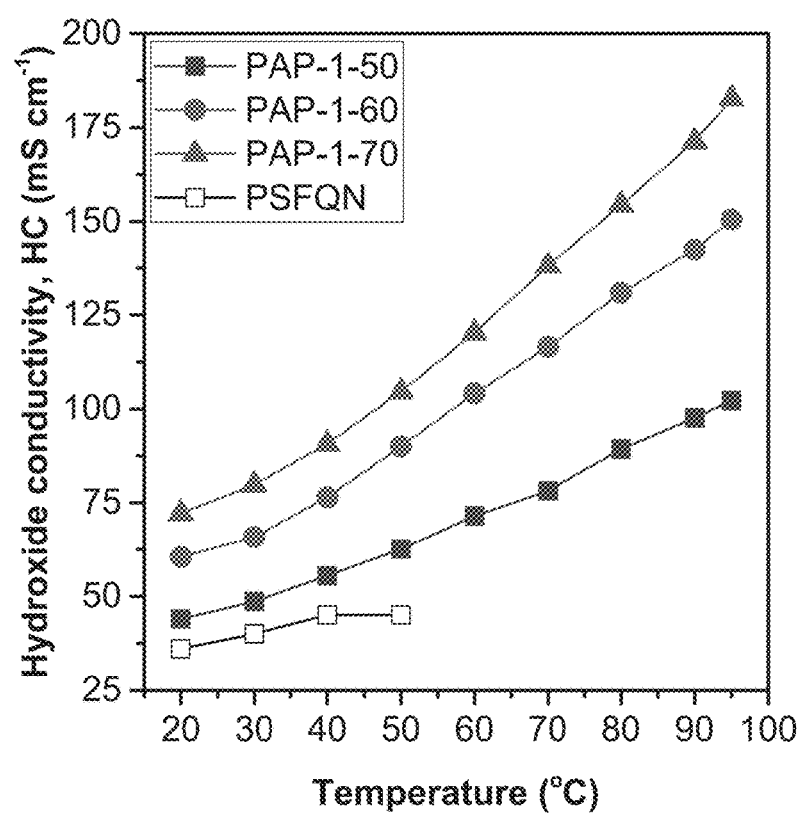
FIG. 5 is a graph of hydroxide conductivity for piperidinium-functionalized polymers PAP-1-50, PAP-1-60, and PAP-1-70 and for PSFQN as a function of temperature.

An ideal material for HEMs/HEIs should have good ion conductivity with low water uptake. All membranes showed very high conductivity in pure water as shown in FIG. 5. For example, at 20° C. the hydroxide conductivity of PAP-1-60 (61 mS/cm) is much greater than PSFQN (the benchmark HEM) which has an IEC value of 36 mS/cm. PSFQN is derived from benzyl trimethyl ammonium polysulfone and has the formula:

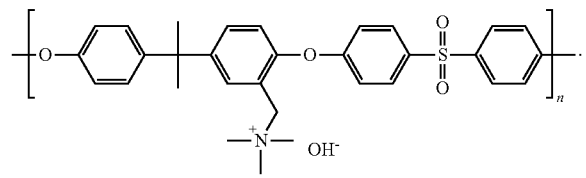

Figure 6:
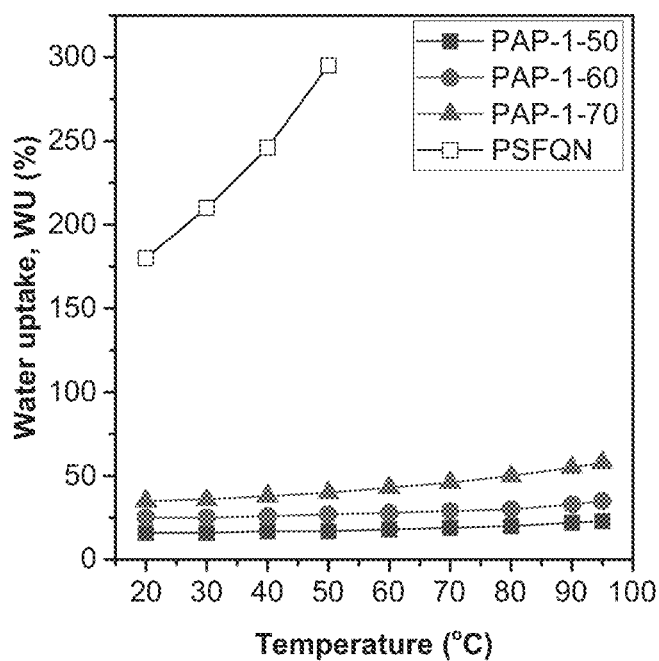
FIG. 6 is a graph of water uptake for piperidinium-functionalized polymers PAP-1-50, PAP-1-60, and PAP-1-70 and for PSFQN as a function of temperature.

Increasing the temperature also enhanced the hydroxide conductivity of the membrane samples. At 95° C., PAP-1-50, PAP-1-60 and PAP-1-70 had hydroxide conductivities of 102, 151 and 183 mS/cm, respectively. PAP-1-x membranes had much lower water uptake value (16% to 35%) when compared with PSFQN (180%) at 20° C. as shown in FIG. 6. Surprisingly, PAP-1-x membranes still maintained very low water uptake at 95° C. (20% to 60%), due to the presence of the rigid aromatic backbone.

(6) Solubility and Mechanical Properties.

Figure 7:
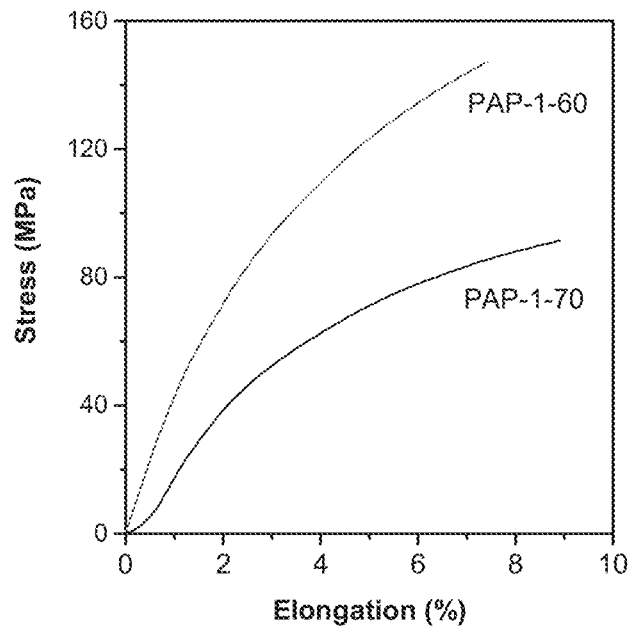
FIG. 7 is a graph depicting tensile stress as a function of elongation for piperidinium-functionalized polymers PAP-1-60 and PAP-1-70.

The PAP-1-x polymers exhibited excellent solubility in dimethylformamide, N-methylpyrrolidone, dimethyl sulfoxide, and isopropanol/water (1/1 weight ratio), but did not dissolve in pure water and isopropanol. The PAP-1-x was insoluble in pure water and isopropanol, even at 100° C., suggesting that it could be used as an ionomer in the catalyst layer without loss arising from water solubility. Therefore, the solvent processability of the PAP-1-x polymers enabled their use not only as HEMs but also as HEIs. The tensile strength and elongation at the break of PAP-1-x were 100-150 MPa and 7-9%, respectively, which meet the requirements for building membrane electrode assemblies (MEAs) in HEMFCs (see FIG. 7).

(7) Hydroxide Exchange Membrane Fuel Cell (HEMFC) Performance.

Figure 8:
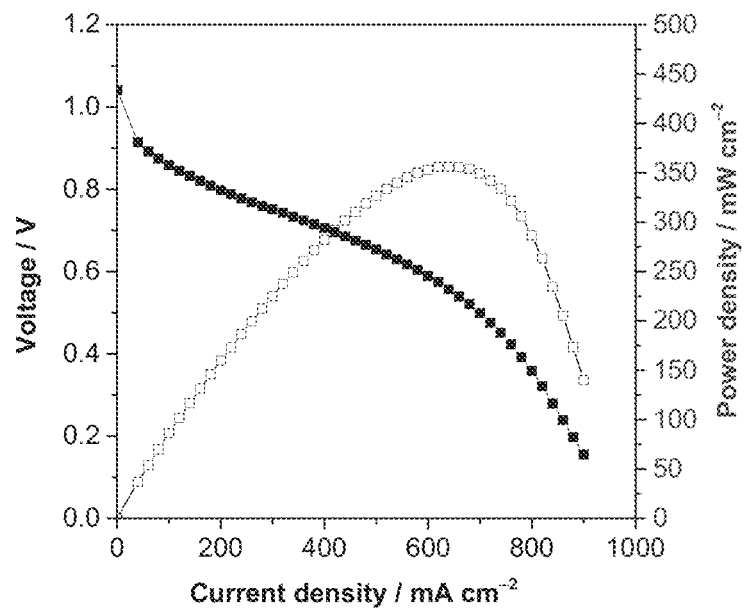
FIG. 8 illustrates Polarization (voltage as a function of current density) and power density (power density as a function of current density) curves of an HEMFC at 95° C. Materials: PAP-1-60 membrane, ionomer loading of 20% PAP-1-70, catalyst loading of 0.4 mg Pt/cm² TKK 50% Pt/C. Test conditions: anode and cathode humidifier at 95° C. and 98° C., respectively, H₂ and O₂ flow rates of 0.6 L/min and back pressures of 0.1 $MPa_g$.
Figure 9:
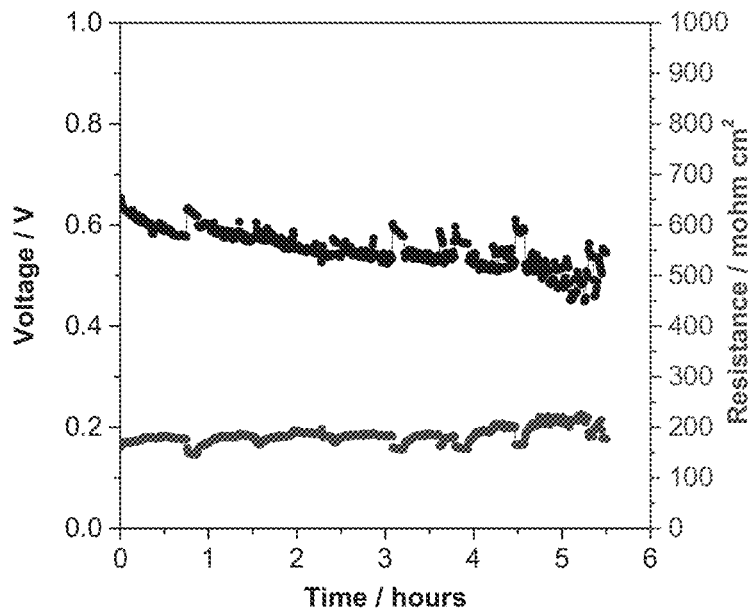
FIG. 9 depicts voltage as a function of time and resistance as a function of time (a lifetime test) for an HEMFC at 95° C. Materials: PAP-1-60 membrane, ionomer loading of 20% PAP-1-70, catalyst loading of 0.4 mg Pt/cm² TKK 50% Pt/C. Test conditions: constant current density of 400 mA/cm², anode and cathode humidifier at 95° C. and 98° C., respectively, H₂ and O₂ flow rates of 0.2 L/min and back pressures of 0.05 $MPa_g$.

Although PAP-1-x membranes have been shown to have superior chemical stability, hydroxide conductivity, low water uptake, good solubility and mechanical properties, the most practical evaluation of these materials is their performance in HEMFC single cells as an HEI in the catalyst layer and as the HEM. Membrane-electrode assemblies (MEAs) were fabricated by depositing 5 cm$^2$ electrode onto both sides of a PAP-1-60 membrane with a robotic sprayer (Sono-Tek ExactaCoat). The electrode ink was prepared by adding 250 mg of catalyst (Tanaka Kikinzoku Kogyo, or TKK, 50% Pt on high-surface-area C) and a desired amount of ionomer (PAP-1-x, prepared by dissolving the PAP-1-x polymer in a water and isopropanol mixture) to 10 g of water and 10 g of isopropanol, followed by sonicating for 1 hour. The catalyst loading was 0.4 mg Pt/cm$^2$. The sandwich was completed by adding a rubber gasket, a GDL (SGL25CC), and a graphite flow field (ElectroChem) to each side of the MEA. Performance was characterized with a fuel cell test system equipped with a back pressure module (Scribner 850e). Normally, the cell was activated for 30 minutes at 100 mA/cm$^2$ and another 30 minutes at 200 mA/cm$^2$. After activation, performance was recorded by scanning current. FIG. 8 shows the polarization curves of an H$_2$/O$_2$ HEMFC with PAP-1-60 as the membrane and PAP-1-70 as the ionomer at 95° C. The open circuit voltages (OCVs) were close to the theoretical value of about 1.1 V, indicating that the PAP-1-70 ionomer did not affect the catalyst function of Pt significantly and the PAP-1-60 membrane separated the fuels very well. The HEMFC showed very high peak power density (356 mW/cm$^2$) and high stability at 95° C. as shown in FIGS. 8 and 9.

Example 2

Another example of a poly(aryl piperidinium) is based on N-methyl-4-piperidone, 2,2,2-trifluoroacetophenone and p-terphenyl (PAP-2-x, x is the mole ratio of N-methyl-4-piperidone to 2,2,2-trifluoroacetophenone, x=1 to 100). The reaction scheme for preparing the polymer is as follows:

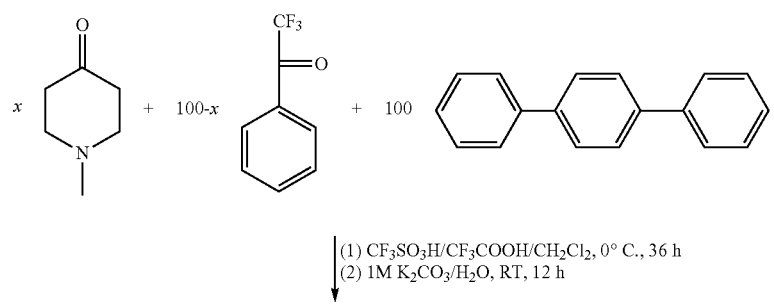

(1) CF$_3$SO$_3$H/CF$_3$COOH/CH$_2$Cl$_2$, 0° C., 36 h
(2) 1M K$_2$CO$_3$/H$_2$O, RT, 12 h

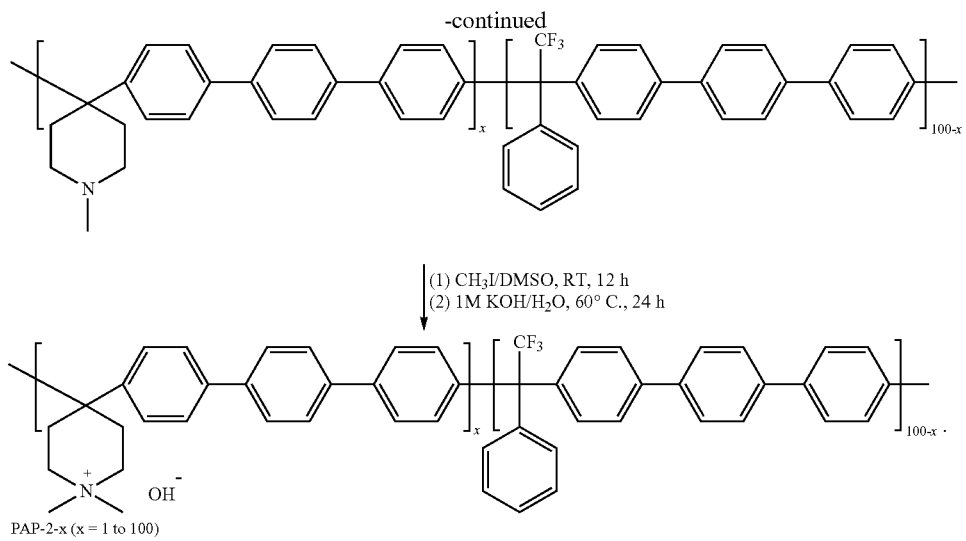

PAP-2-x (x = 1 to 100)

(1) Synthesis of Piperidine-Functionalized Polymer.

Figure 10:
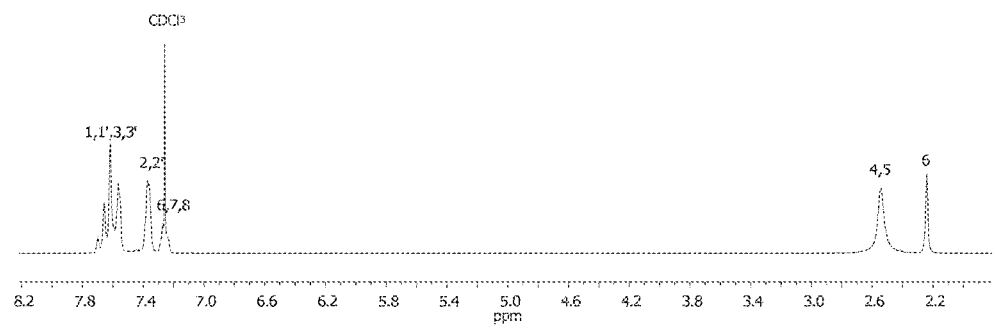
FIG. 10 shows an ¹H NMR spectrum of a piperidine-functionalized polymer used in making PAP-2-75.

To a 100 mL three-necked flask equipped with overhead mechanical stirrer, N-methyl-4-piperidone (0.8487 g, 7.5 mmol), 2,2,2-trifluoroacetophenone (0.4353 g, 2.5 mmol) and biphenyl (1.5421 g, 10 mmol) were dissolved into methylene chloride (10 mL). TFA (0.5 mL) and TFSA (10 mL) were then added dropwise over 30 minutes at 0° C. Thereafter, the reaction was continued at this temperature for 36 hours. The resulting viscous, brown solution was poured slowly into ethanol. The white fibrous solid was filtered, washed with water and immersed in 1 M $K_2CO_3$ at room temperature for 12 hours. Finally, the white fibrous product was filtered, washed with water and dried completely at 60° C. under vacuum. The yield of the polymer was nearly 100%. $^1$H NMR (CDCl$_3$, δ, ppm): 7.70-7.56 ($H_1$, $H_{1'}$, $H_3$, and $H_{3'}$), 7.37-7.19 ($H_2$, $H_{2'}$, $H_6$, $H_7$ and $H_8$), 2.54 ($H_4$ and $H_5$), and 2.24 ($H_6$) (FIG. 10).

(2) Synthesis of Piperidinium-Functionalized Polymer (PAP-2-75).

Figure 11:
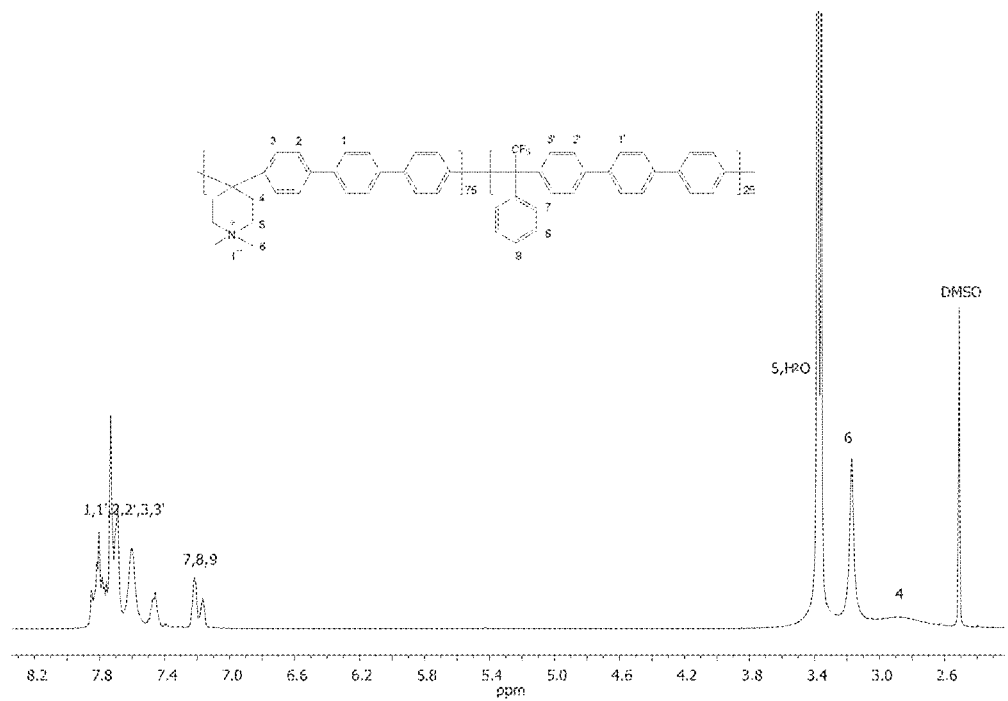
FIG. 11 shows an ¹H NMR spectrum of a piperidinium-functionalized polymer PAP-2-75.

To a 50 mL one-necked flask equipped with magnetic bar, the piperidine-functionalized polymer (1.0 g) was dissolved into DMSO (20 mL). Methyl iodide (1 mL) was added quickly. The solution was stirred over 12 hours at room temperature. The resulting viscous, yellow solution was added dropwise into ether. The yellow solid was filtered, washed with ether and dried completely at 60° C. under vacuum. The yield of the polymer PAP-2-75 was almost 100%. $^1$H NMR (DMSO-d6, δ, ppm): 7.98-7.46 ($H_1$, $H_{1'}$, $H_2$, $H_{2'}$, $H_3$ and $H_{3'}$), 7.22-7.17 ($H_7$, $H_8$ and $H_9$), 3.38 ($H_5$), 3.17 ($H_6$), and 2.85 ($H_4$) (FIG. 11).

(3) PAP-2-75 Membrane Casting and Hydroxide Exchange.

Membrane was prepared by dissolving the PAP-2-75 polymer (1.0 g) in DMSO (30 mL) and casting on a clear glass plate at 80° C. for 8 hours. The membrane (in iodide form) was peeled off from a glass plate in contact with deionized (DI) water. The membrane in hydroxide form was obtained by ion exchange in 1 M KOH at 60° C. for 24 hours, followed by washing and immersion in DI water for 48 hours under argon to remove residual KOH.

(4) Water Uptake and Hydroxide Conductivity.

Figure 12:
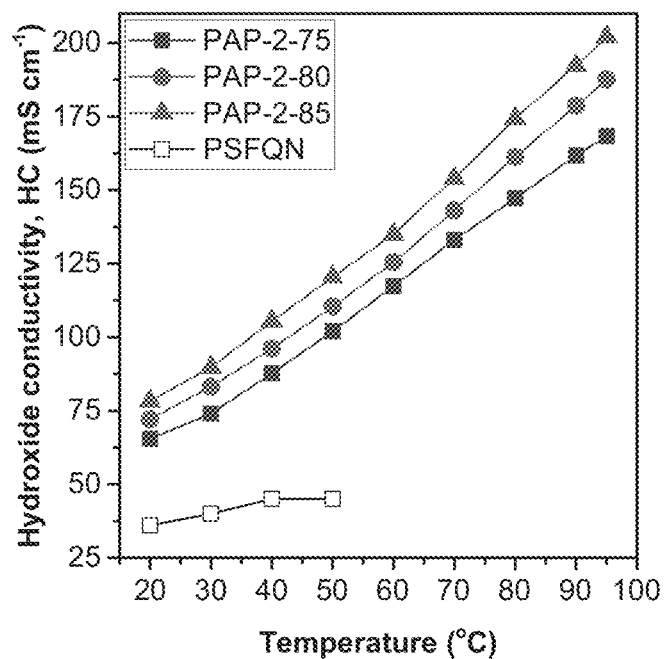
FIG. 12 depicts hydroxide conductivity as a function of temperature for piperidinium-functionalized polymers PAP-2-75, PAP-2-80 and PAP-2-85.
Figure 13:
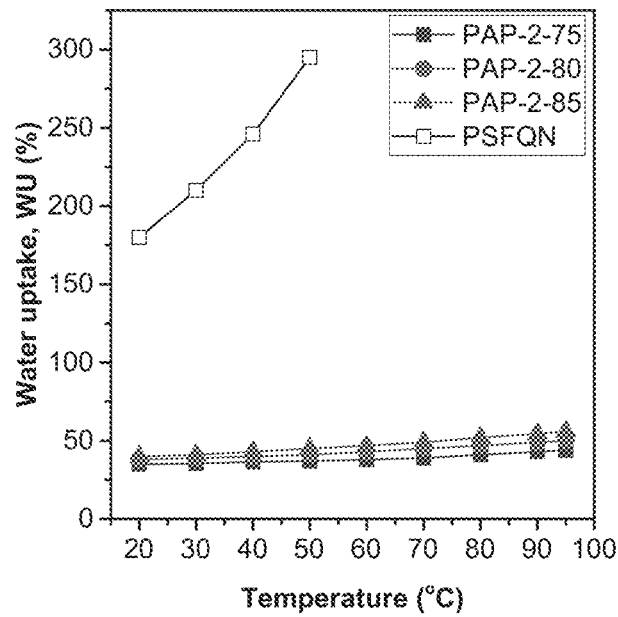
FIG. 13 depicts water uptake as a function of temperature for piperidinium-functionalized polymers PAP-2-75, PAP-2-80 and PAP-2-85.

All membranes showed superior conductivity (as shown in FIG. 12) and low water uptake (as shown in FIG. 13) in pure water from 20° C. to 95° C.

Example 3

Another poly(aryl piperidinium) polymer is based on N-methyl-4-piperidone, 2,2,2-trifluoroacetophenone and p-quaterphenyl (PAP-3-x, wherein x is the mole ratio of N-methyl-4-piperidone to 2,2,2-trifluoroacetophenone, x=1 to 100). The synthesis of PAP-3-x is similar to PAP-1-x and is shown in the reaction scheme below:

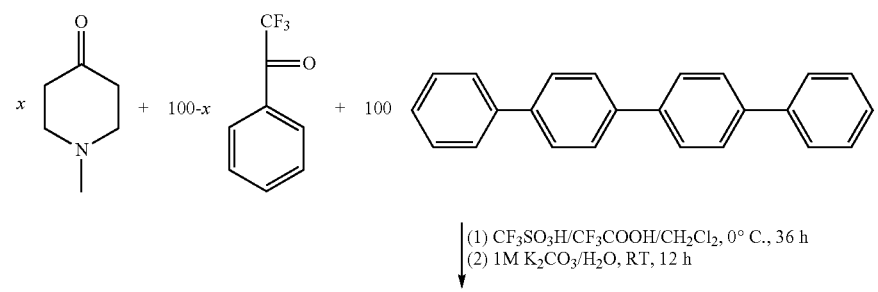

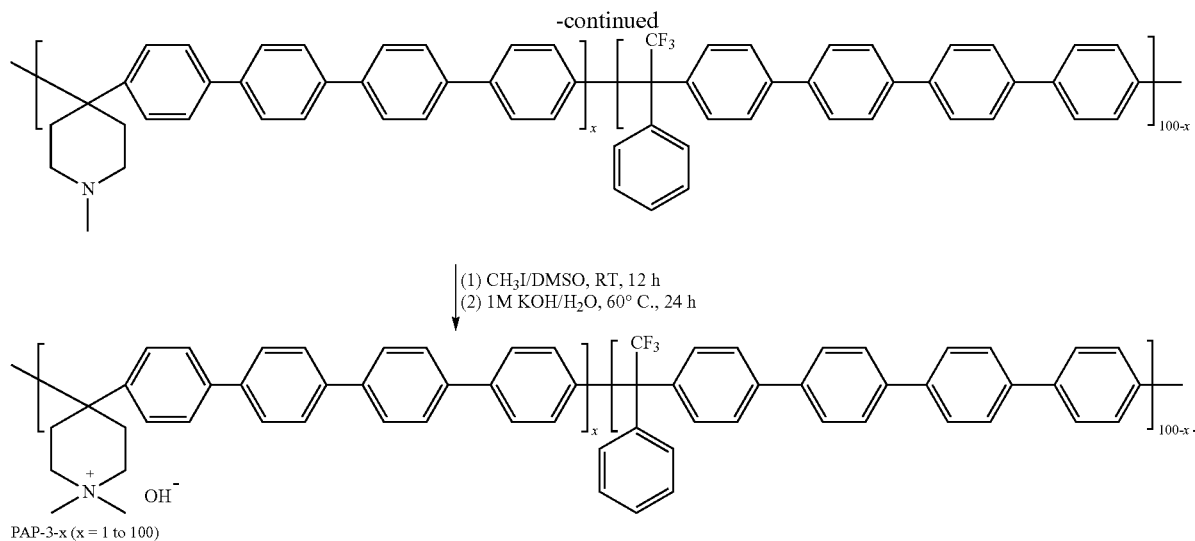

PAP-3-x (x = 1 to 100)

Example 4

Another poly(aryl piperidinium) polymer is based on N-methyl-4-piperidone, 2,2,2-trifluoroacetophenone and benzene (PAP-4-x, x is the mole ratio of N-methyl-4-piperidone to 2,2,2-trifluoroacetophenone, x=1 to 100). The synthesis of PAP-4-x is similar to PAP-1-x and the reaction scheme is shown below:

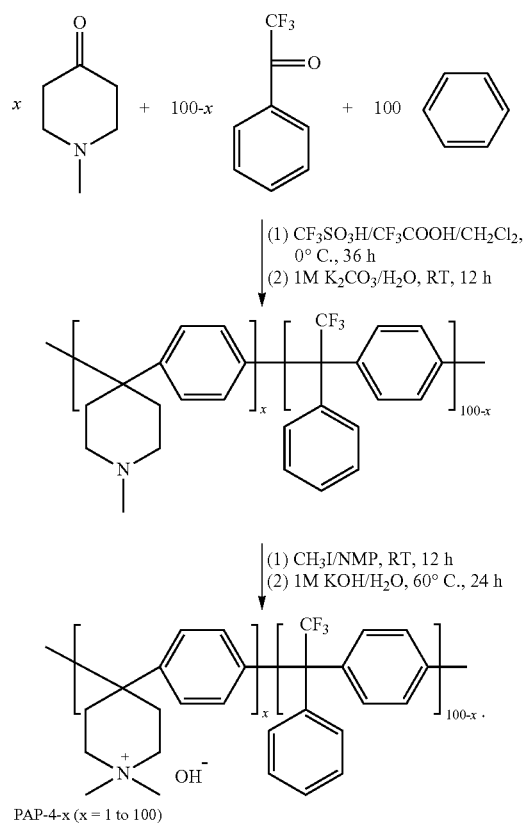

PAP-4-x (x = 1 to 100)

Example 5

Another poly(aryl piperidinium) polymer is based on 3-oxo-6-azoniaspiro[5.5]undecane iodide, 2,2,2-trifluoroacetophenone, and biphenyl (PAP-ASU-1-x, x is the mole ratio of 3-oxo-6-azoniaspiro[5.5]undecane iodide and 2,2,2-trifluoroacetophenone, x=1 to 100). The reaction scheme for the synthesis is as follows:

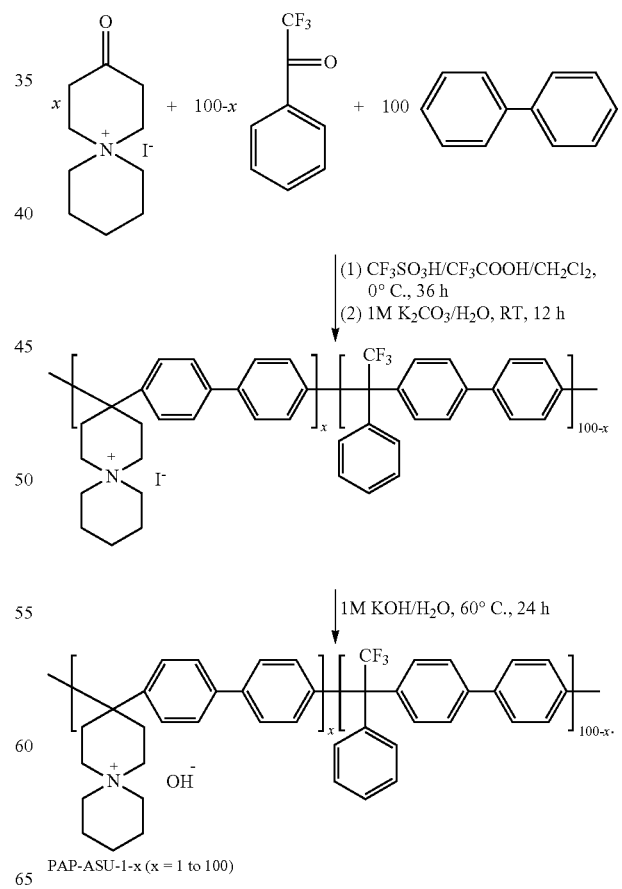

PAP-ASU-1-x (x = 1 to 100)

Example 6

Yet another poly(aryl piperidinium) polymer is based on 3-oxo-6-azoniaspiro[5.5]undecane iodide, 2,2,2-trifluoroacetophenone and p-terphenyl (PAP-ASU-2-x, wherein x is the mole ratio of 3-oxo-6-azoniaspiro[5.5]undecane iodide to 2,2,2-trifluoroacetophenone, x=1 to 100). The reaction scheme for the polymer synthesis is shown below:

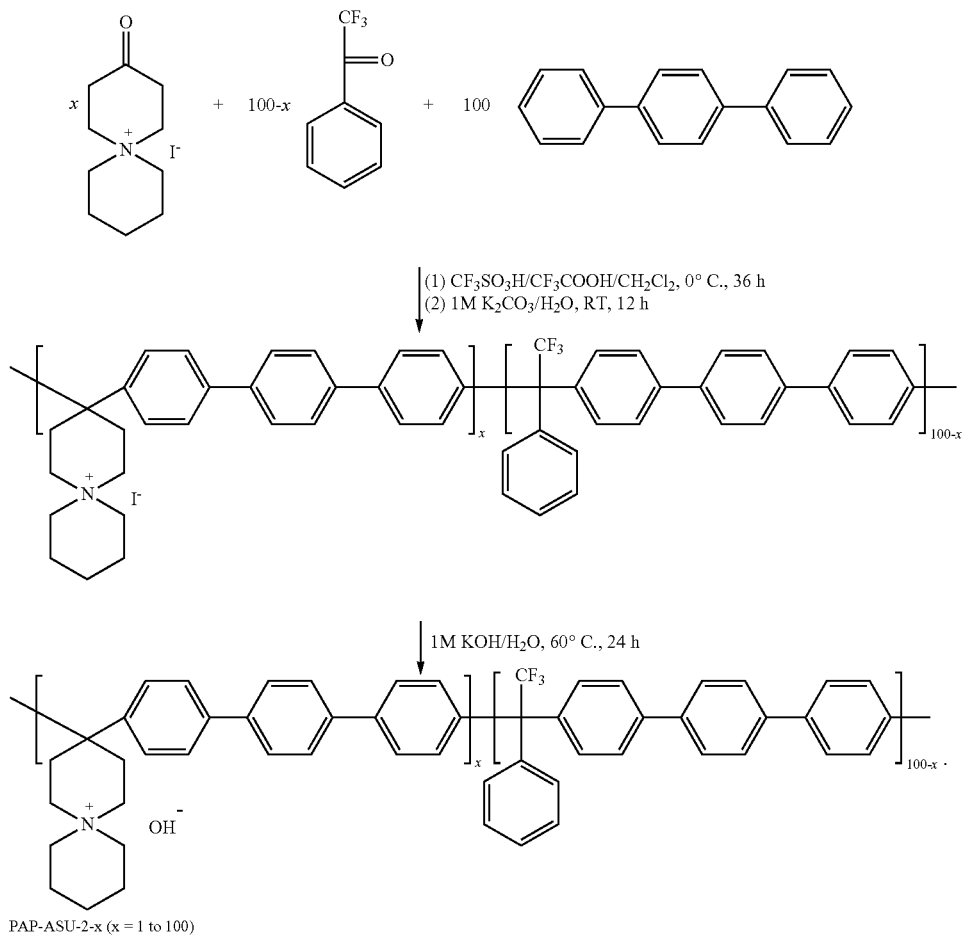

PAP-ASU-2-x (x = 1 to 100)

Example 7

Another poly(aryl piperidinium) polymer is based on 3-oxo-6-azoniaspiro[5.5]undecane iodide, 2,2,2-trifluoroacetophenone and p-quaterphenyl (PAP-ASU-3-x, wherein x is the mole ratio of 3-oxo-6-azoniaspiro[5.5]undecane iodide to 2,2,2-trifluoroacetophenone, x=1 to 100). The polymer synthesis reaction scheme is shown below:

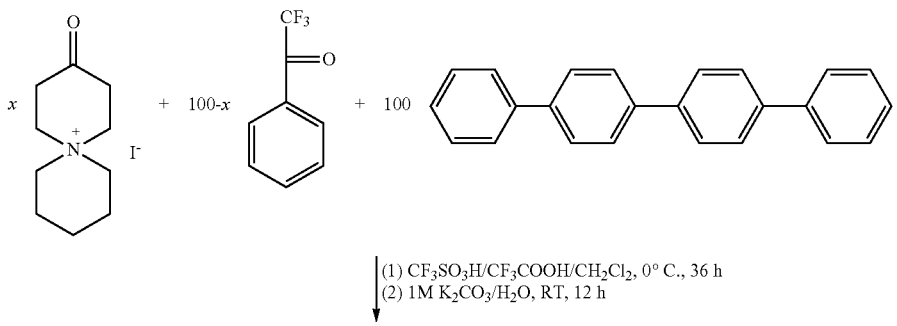

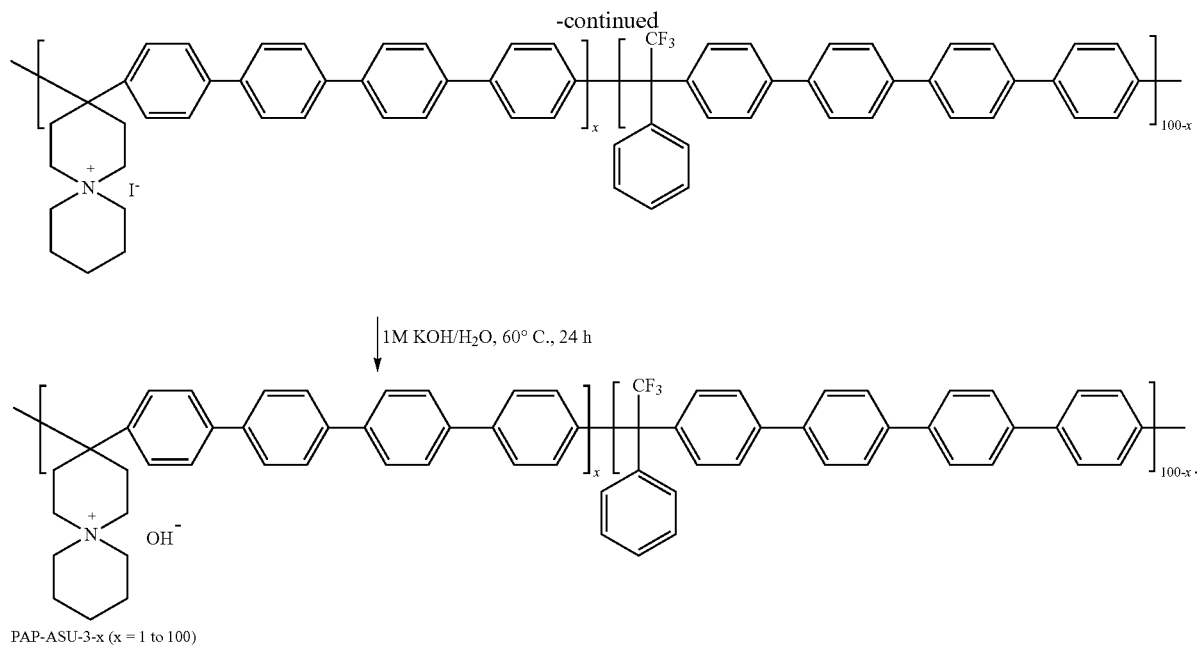

PAP-ASU-3-x (x = 1 to 100)

Example 8

Another poly(aryl piperidinium) polymer is based on 3-oxo-6-azoniaspiro[5.5]undecane iodide, 2,2,2-trifluoroacetophenone and benzene (PAP-ASU-4-x, wherein x is the mole ratio of 3-oxo-6-azoniaspiro[5.5]undecane iodide to 2,2,2-trifluoroacetophenone, x=1 to 100). The reaction scheme for the polymer synthesis is shown below:

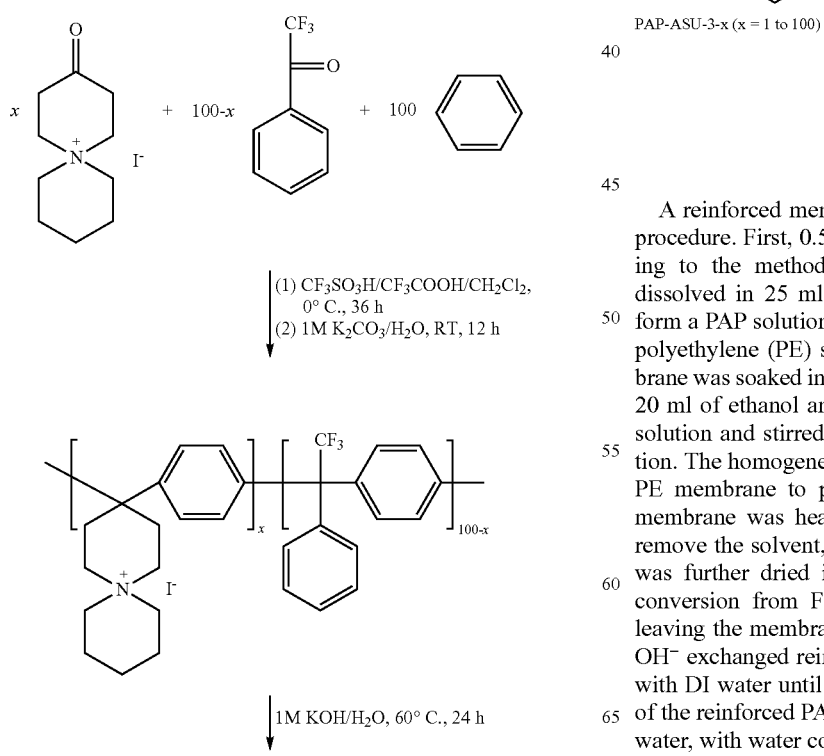

PAP-ASU-3-x (x = 1 to 100)

Example 9

A reinforced membrane was fabricated by the following procedure. First, 0.5 g PAP-2-85 polymer (prepared according to the method of Example 2) in iodine form was dissolved in 25 ml dimethylformamide solvent (DMF) to form a PAP solution. To improve the wettability of a 20 μm polyethylene (PE) substrate in DMF, the porous PE membrane was soaked in anhydrous ethanol for 24 h. Meanwhile, 20 ml of ethanol and 5 ml water were added into the PAP solution and stirred for 24 h to form a homogeneous solution. The homogeneous solution was casted onto the wetted PE membrane to prepare the reinforced membrane. The membrane was heated in an oven at 60° C. for 24 h to remove the solvent, and the resulting reinforced membrane was further dried in a vacuum at 80° C. for 12 h. The conversion from F form to $OH^-$ form was achieved by leaving the membrane in 1 M KOH for 24 h at 60° C. The $OH^-$ exchanged reinforced PAP/PE membrane was washed with DI water until pH of 7 was reached. The conductivity of the reinforced PAP/PE HEM is 20 mS/cm at 20° C. in DI water, with water content up is about 18%. The thickness of the reinforced PAP/PE HEM is about 30 μm.

DEFINITIONS

The term "suitable substituent," as used herein, is intended to mean a chemically acceptable functional group, preferably a moiety that does not negate the activity of the inventive compounds. Such suitable substituents include, but are not limited to halo groups, perfluoroalkyl groups, perfluoroalkoxy groups, alkyl groups, alkenyl groups, alkynyl groups, hydroxy groups, oxo groups, mercapto groups, alkylthio groups, alkoxy groups, aryl or heteroaryl groups, aryloxy or heteroaryloxy groups, aralkyl or heteroaralkyl groups, aralkoxy or heteroaralkoxy groups, HO—(C=O)— groups, heterocylic groups, cycloalkyl groups, amino groups, alkyl- and dialkylamino groups, carbamoyl groups, alkylcarbonyl groups, alkoxycarbonyl groups, alkylaminocarbonyl groups, dialkylamino carbonyl groups, arylcarbonyl groups, aryloxycarbonyl groups, alkylsulfonyl groups, and arylsulfonyl groups. Those skilled in the art will appreciate that many substituents can be substituted by additional substituents.

The term "alkyl," as used herein, refers to a linear, branched or cyclic hydrocarbon radical, preferably having 1 to 32 carbon atoms (i.e., 1, 2, 3, 4, 5, 6, 7, 8, 9, 10, 11, 12, 13, 14, 15, 16, 17, 18, 19, 20, 21, 22, 23, 24, 25, 26, 27, 28, 39, 30, 31, or 32 carbons), and more preferably having 1 to 18 carbon atoms. Alkyl groups include, but are not limited to, methyl, ethyl, n-propyl, isopropyl, n-butyl, iso-butyl, secondary-butyl, and tertiary-butyl. Alkyl groups can be unsubstituted or substituted by one or more suitable substituents.

The term "alkenyl," as used herein, refers to a straight, branched or cyclic hydrocarbon radical, preferably having 2, 3, 4, 5, 6, 7, 8, 9, 10, 11, 12, 13, 14, 15, 16, 17, 18, 19, 20, 21, 22, 23, 24, 25, 26, 27, 28, 39, 30, 31, or 32 carbons, more preferably having 1 to 18 carbon atoms, and having one or more carbon-carbon double bonds. Alkenyl groups include, but are not limited to, ethenyl, 1-propenyl, 2-propenyl (allyl), iso-propenyl, 2-methyl-1-propenyl, 1-butenyl, and 2-butenyl. Alkenyl groups can be unsubstituted or substituted by one or more suitable substituents, as defined above.

The term "alkynyl," as used herein, refers to a straight, branched or cyclic hydrocarbon radical, preferably having 2, 3, 4, 5, 6, 7, 8, 9, 10, 11, 12, 13, 14, 15, 16, 17, 18, 19, 20, 21, 22, 23, 24, 25, 26, 27, 28, 39, 30, 31, or 32 carbons, more preferably having 1 to 18 carbon atoms, and having one or more carbon-carbon triple bonds. Alkynyl groups include, but are not limited to, ethynyl, propynyl, and butynyl. Alkynyl groups can be unsubstituted or substituted by one or more suitable substituents, as defined above.

The term "aryl," as used herein, means monocyclic, bicyclic, or tricyclic aromatic radicals such as phenyl, naphthyl, tetrahydronaphthyl, indanyl and the like; optionally substituted by one or more suitable substituents, preferably 1 to 5 suitable substituents, as defined above. The term "aryl" also includes heteroaryl.

The term "cycloalkyl," as used herein, refers to a mono, bicyclic or tricyclic carbocyclic radical (e.g., cyclopropyl, cyclobutyl, cyclopentyl, cyclohexyl, cycloheptyl, cyclooctyl, cyclononyl, cyclopentenyl, cyclohexenyl, bicyclo[2.2.1]heptanyl, bicyclo[3.2.1]octanyl and bicyclo[5.2.0]nonanyl, etc.); optionally containing 1 or 2 double bonds. Cycloalkyl groups can be unsubstituted or substituted by one or more suitable substituents, preferably 1 to 5 suitable substituents, as defined above.

The term "ether" as used herein represents a bivalent (i.e., difunctional) group including at least one ether linkage (i.e., —O—).

The term "heteroaryl," as used herein, refers to a monocyclic, bicyclic, or tricyclic aromatic heterocyclic group containing one or more heteroatoms (e.g., 1 to 3 heteroatoms) selected from O, S and N in the ring(s). Heteroaryl groups include, but are not limited to, pyridyl, pyrazinyl, pyrimidinyl, pyridazinyl, thienyl, furyl, imidazolyl, pyrrolyl, oxazolyl (e.g., 1,3-oxazolyl, 1,2-oxazolyl), thiazolyl (e.g., 1,2-thiazolyl, 1,3-thiazolyl), pyrazolyl, tetrazolyl, triazolyl (e.g., 1,2,3-triazolyl, 1,2,4-triazolyl), oxadiazolyl (e.g., 1,2,3-oxadiazolyl), thiadiazolyl (e.g., 1,3,4-thiadiazolyl), quinolyl, isoquinolyl, benzothienyl, benzofuryl, and indolyl. Heteroaryl groups can be unsubstituted or substituted by one or more suitable substituents, preferably 1 to 5 suitable substituents, as defined above. The term "hydrocarbon" as used herein describes a compound or radical consisting exclusively of the elements carbon and hydrogen.

The term "substituted" means that in the group in question, at least one hydrogen atom bound to a carbon atom is replaced with one or more substituent groups such as hydroxy (—OH), alkylthio, phosphino, amido (—CON($R_A$)($R_B$), wherein $R_A$ and $R_B$ are independently hydrogen, alkyl, or aryl), amino(-N($R_A$)($R_B$), wherein $R_A$ and $R_B$ are independently hydrogen, alkyl, or aryl), halo (fluoro, chloro, bromo, or iodo), silyl, nitro (—NO$_2$), an ether (—OR$_A$ wherein $R_A$ is alkyl or aryl), an ester (—OC(O)R$_A$ wherein $R_A$ is alkyl or aryl), keto (—C(O)R$_A$ wherein $R_A$ is alkyl or aryl), heterocyclo, and the like. When the term "substituted" introduces or follows a list of possible substituted groups, it is intended that the term apply to every member of that group. That is, the phrase "optionally substituted alkyl or aryl" is to be interpreted as "optionally substituted alkyl or optionally substituted aryl." Likewise, the phrase "alkyl or aryl optionally substituted with fluoride" is to be interpreted as "alkyl optionally substituted with fluoride or aryl optionally substituted with fluoride."

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description and shown in the accompanying drawings shall be interpreted as illustrative and not in a limiting sense.

What is claimed is:
1. A polymer wherein the polymer is one of the following:
(A) the polymer comprises a reaction product of a polymerization mixture comprising
(i) a piperidone monomer having the formula:

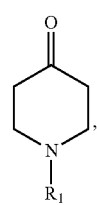

(1)

or a 3-oxo-6-azoniaspiro[5.5]undecane salt monomer having the formula:

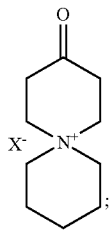
(2)

(ii) an aromatic monomer having the formula:

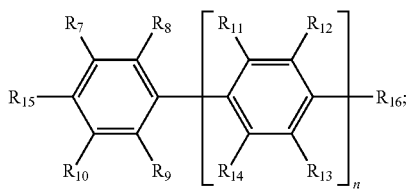
(3)

and (iii) optionally, a trifluoroacetophenone monomer having the formula:

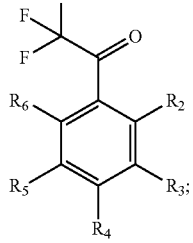
(4)

wherein:

$R_1$ is alkyl, alkenyl, or alkynyl, and the alkyl, alkenyl or alkynyl are optionally substituted with fluoride;

$R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$, and $R_{16}$ are each independently hydrogen, alkyl, alkenyl, or alkynyl, and the alkyl, alkenyl or alkynyl are optionally substituted with fluoride;

n is 0, 1, 2 or 3; and $X^-$ is an anion; or (B) the polymer is an anion exchange polymer comprising structural units of Formulae 1A or 2A, 3A, and optionally 4A, wherein the sum of the mole fractions of the structural unit of Formula 1A or 2A and Formulae 4A is equal to the mole fraction of Formulae 3A in the polymer, and the mole ratio of the structural unit of Formula 1A or 2A to the structural unit of Formula 3A is from 0.01 to 1, wherein the structural units of Formulae 1A, 2A, 3A and 4A have the structures:

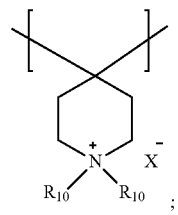
(1A)

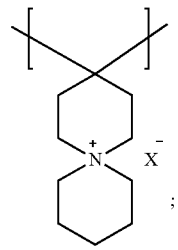
(2A)

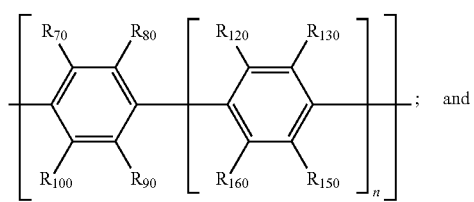
(3A)

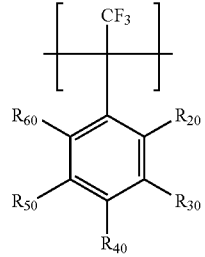
(4A)

wherein:

$R_{10}$ are each independently alkyl, alkenyl, or alkynyl, and the alkyl, alkenyl or alkynyl are optionally substituted with fluoride;

$R_{20}$, $R_{30}$, $R_{40}$, $R_{50}$, $R_{60}$, $R_{70}$, $R_{80}$, $R_{90}$, $R_{100}$, $R_{120}$, $R_{130}$, $R_{150}$, and $R_{160}$ are each independently hydrogen, alkyl, alkenyl, or alkynyl, and the alkyl, alkenyl or alkynyl are optionally substituted with fluoride;

n is 0, 1, 2 or 3; and $X^-$ is an anion; or (C) the polymer is an hydroxide exchange polymer comprising a poly(aryl piperidinium) backbone free of ether linkages, and having water uptake not more than 60% based on the dry weight of the polymer when immersed in pure water at 95° C., or having hydroxide conductivity in pure water at 95° C. of at least 100 mS/cm; or (D) the polymer is an hydroxide exchange polymer comprising a poly(aryl piperidinium) backbone wherein the polymer (D) has: and having:

a peak power density of at least 350 mW/cm² when the polymer is used as an hydroxide exchange membrane of an hydroxide exchange membrane fuel cell and is loaded at 20% as an hydroxide exchange ionomer in the cathodic and anodic catalyst layers of the fuel cell, the fuel cell having a 50% Pt/C catalyst and catalyst loading of 0.4 mg Pt/cm², and test conditions being hydrogen and oxygen flow rates of 0.6 L/min, back pressure of 0.1 MPa$_g$, and anode and cathode humidifiers at 95° C. and 98° C., respectively; or a decrease in voltage over 5.5 hours of operation of not more than 20% and an increase in resistance over 5.5 hours of operation of not more than 20% when the polymer is used as an hydroxide exchange membrane of an hydroxide exchange membrane fuel cell and is loaded at 20% as an hydroxide exchange ionomer in the cathodic and anodic catalyst layers of the fuel cell, the fuel cell having a 50% Pt/C catalyst and catalyst loading of 0.4 mg Pt/cm$^2$, and test conditions being constant current density of 400 mA/cm$^2$, hydrogen and oxygen flow rates of 0.2 L/min, back pressure of 0.05 MPa$_g$, and anode and cathode humidifiers at 95° C. and 98° C., respectively.

2. A polymer wherein either:

(1) the polymer comprises a reaction product of an alkylating agent and the polymer of (A) of claim 1 comprising the reaction product of the polymerization mixture comprising the piperidone monomer; or (2) the polymer comprises a reaction product of a base and either the polymer of claim 1 or the reaction product of the alkylating agent and the polymer of (A) of claim 1, the polymer of (A) comprising the reaction product of the polymerization mixture comprising the 3-oxo-6-azoniaspiro[5.5]undecane salt.

3. The polymer of (A) of claim 1, wherein the piperidone monomer comprises N-methyl-4-piperidone; the 3-oxo-6-azoniaspiro[5.5]undecane salt monomer comprises 3-oxo-6-azoniaspiro[5.5]undecane iodide; the 2,2,2-trifluoroacetophenone monomer comprises 2,2,2-trifluoroacetophenone; and the aromatic monomer comprises biphenyl, para-terphenyl, para-quaterphenyl or benzene.

4. The polymer of (A) of claim 1, wherein R$_1$ is alkyl; and R$_2$, R$_3$, R$_4$, R$_5$, R$_6$, R$_7$, R$_8$, R$_9$, R$_{10}$, R$_{11}$, R$_{12}$, R$_{13}$, R$_{14}$, R$_{15}$, and R$_{16}$ are each independently hydrogen, or alkyl optionally substituted with fluoride.

5. The polymer of (A) of claim 1, wherein R$_1$ is methyl, ethyl, propyl, butyl, pentyl, or hexyl; and R$_2$, R$_3$, R$_4$, R$_5$, R$_6$, R$_7$, R$_8$, R$_9$, R$_{10}$, R$_{11}$, R$_{12}$, R$_{13}$, R$_{14}$, R$_{15}$, and R$_{16}$ are each independently hydrogen, methyl, ethyl, propyl, butyl, pentyl, or hexyl, or methyl, ethyl, propyl, butyl, pentyl, or hexyl optionally substituted with fluoride.

6. The polymer of (2) of claim 2, wherein the base comprises a hydroxide-containing base.

7. The polymer of claim 6, wherein the hydroxide-containing base comprises sodium hydroxide or potassium hydroxide.

8. The polymer of (A) or (B) of claim 1, wherein X$^-$ comprises a halide, BF$_4^-$, or PF$_6^-$.

9. The polymer of (C) of claim 1, wherein the polymer has water uptake not more than 60% based on the dry weight of the polymer when immersed in pure water at 95° C., and has hydroxide conductivity in pure water at 95° C. of at least 100 mS/cm.

10. The polymer of (C) of claim 1, wherein the polymer is stable to degradation (as evidenced by no change in peak position on its $^1$H NMR spectra) when immersed in 1 M potassium hydroxide at 100° C. for 2,000 hours.

11. The polymer of (C) of claim 1, wherein the polymer is insoluble in pure water and isopropanol at 100° C., but is soluble in a 50/50 mixture by weight of water and isopropanol at 100° C.

12. The polymer of (C) of claim 1, wherein the polymer has a tensile strength of at least 100 MPa and elongation at break of at least 7%.

13. The polymer of (C) of claim 1, wherein the polymer has a tensile strength of at least 100 MPa and elongation at break of at least 7%.

14. The polymer of (C) or (D) of claim 1, wherein the aryl linkages of the poly(aryl piperidinium) backbone free of ether linkages comprise p-phenyl, and the piperidinium linkages comprise hydroxide anions.

15. The polymer of claim 14, wherein the aryl linkages are derived from biphenyl, para-terphenyl, para-quaterphenyl or benzene monomers.

16. The polymer of (C) or (D) of claim 1, wherein the piperidinium linkages are derived from N,N-dimethyl-4-piperidinium or 3-oxo-6-azoniaspiro[5.5]undecane salt monomers.

17. The polymer of (C) or (D) of claim 1, further comprising 2,2,2-trifluoroethylbenzene linkages derived from 2,2,2-trifluoroacetophenone monomer.

18. A method of making the polymer of claim 2, the method comprising either:

(a) reacting the piperidone monomer, the optional 2,2,2-trifluoroacetophenone monomer, and the aromatic monomer in the presence of an organic solvent and a polymerization catalyst to form a piperidine-functionalized intermediate polymer;

alkylating the piperidine-functionalized intermediate polymer in the presence of an organic solvent to form a piperidinium-functionalized intermediate polymer; and reacting the piperidinium-functionalized intermediate polymer with a base to form the polymer; or (b) reacting the piperidone monomer, the optional 2,2,2-trifluoroacetophenone monomer, and the aromatic monomer in the presence of an organic solvent and a polymerization catalyst to form a piperidine-functionalized intermediate polymer;

reacting the piperidine-functionalized intermediate polymer with an alkylating agent in the presence of an organic solvent to form a piperidinium-functionalized intermediate polymer;

dissolving the piperidinium-functionalized intermediate polymer in a solvent to form a polymer solution;

casting the polymer solution to form a polymer membrane; and exchanging anions of the polymer membrane with hydroxide ions to form the hydroxide exchange polymer membrane.

19. The method of claim 18, wherein the polymerization catalyst comprises trifluoromethanesulfonic acid, pentafluoroethanesulfonic acid, heptafluoro-1-propanesulfonic acid, trifluoroacetic acid, perfluoropropionic acid, heptafluorobutyric acid, or a combination thereof.

20. The method of claim 18, wherein the alkylating agent comprises methyl iodide, iodoethane, 1-iodopropane, 1-iodobutane, 1-iodopentane, 1-iodohexane, or a combination thereof.

21. The method of claim 18, wherein each of the organic solvents independently comprises dimethyl sulfoxide, 1-methyl-2-pyrrolidinone, dimethylformamide, methylene chloride, trifluoroacetic acid, trifluoromethanesulfonic acid, chloroform, 1,1,2,2-tetrachloroethane, or a combination thereof.

22. An anion exchange membrane fuel cell, anion exchange membrane optionally configured and sized for use in a fuel cell, electrolyzer, electrodialyzer, solar hydrogen generator, flow battery, desalinator, sensor, demineralization of water, ultra-pure water production, waste water treatment, ion exchanger, or a reinforced electrolyte membrane optionally configured and sized for use in a fuel cell, electrolyzer, electrodialyzer, solar hydrogen generator, flow battery, desalinator, sensor, demineralization of water, ultra-pure water production, waste water treatment, ion exchanger, the fuel cell or anion exchange membrane comprising the polymer of claim 2, or the reinforced electrolyte membrane comprising a porous substrate impregnated with the polymer of claim 2.

23. The reinforced electrolyte membrane of claim 22, wherein the porous substrate comprises polytetrafluoroethylene, polypropylene, polyethylene, or poly(ether) ketone, and the membrane is optionally a dimensionally stable membrane.

24. The reinforced electrolyte membrane of claim 22, wherein
the porous substrate has a porous microstructure of polymeric fibrils;
an interior volume of the porous substrate is rendered occlusive by impregnation with the polymer;
the porous substrate comprises a microstructure of nodes interconnected by fibrils;
the porous substrate has a thickness from about 1 micron to about 30 microns.

25. The reinforced electrolyte membrane of claim 22, wherein the membrane is prepared by multiple impregnations of the substrate with the polymer.

26. The reinforced electrolyte membrane of claim 22, wherein the membrane is prepared by: wetting the porous substrate in a liquid to form a wetted substrate; dissolving the polymer in a solvent to form a homogeneous solution; applying the solution onto the wetted substrate to form the reinforced membrane; and drying the membrane.

* * * * *